US012801279B2

(12) United States Patent
Porzio et al.

(10) Patent No.: US 12,801,279 B2
(45) Date of Patent: Nov. 17, 2026

(54) CHANGE LOG COMPRESSION

(71) Applicant: Micron Technology, Inc., Boise, ID (US)

(72) Inventors: Luca Porzio, Casalnuovo (IT); Jonathan S. Parry, Boise, ID (US); Brian Matthew Toronyi, Boulder, CO (US); Stephen Hanna, Fort Collins, CO (US); Dionisio Minopoli, Frattamaggiore (IT); David Aaron Palmer, Boise, ID (US); Roberto Izzi, Caserta (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/954,256

(22) Filed: Nov. 20, 2024

(65) Prior Publication Data

US 2025/0181241 A1 Jun. 5, 2025

Related U.S. Application Data

(60) Provisional application No. 63/604,757, filed on Nov. 30, 2023.

(51) Int. Cl.
*G06F 3/06* (2006.01)

(52) U.S. Cl.
CPC .......... *G06F 3/0608* (2013.01); *G06F 3/0659* (2013.01); *G06F 3/0679* (2013.01)

(58) Field of Classification Search
CPC ...... G06F 3/0608; G06F 3/064; G06F 3/0659; G06F 3/0679; G06F 12/0246; G06F 2212/7201; G06F 2212/401; G06F 12/0292; G06F 2212/7207
See application file for complete search history.

(56) References Cited

U.S. PATENT DOCUMENTS

2019/0235755 A1* 8/2019 Abe .................... G06F 3/0683
2020/0310669 A1* 10/2020 Bazarsky ............ G06F 3/0647
2022/0269407 A1* 8/2022 Wang .................. G06F 3/0608
2023/0195646 A1* 6/2023 Liu .................... G06F 12/0246
711/206

* cited by examiner

*Primary Examiner* — Jane W Benner
(74) *Attorney, Agent, or Firm* — Holland & Hart LLP

(57) ABSTRACT

Various aspects of the present disclosure relate to enabling a memory system to support compressing entries of a change log and improving the efficiency of the memory system by enabling the memory system changes associated with the change log to occur concurrently. Either a "staged" compression technique or a "direct" compression technique may be used to compress entries of the change log. In the case of a staged compression, the memory system may merge a new entry with a staged entry, may update the previously-staged entry, and may subsequently release the merged entry to the change log. In the case of a direct compression, the memory system may decide whether the backend entry can be directly merged with existing entries of the change log.

20 Claims, 10 Drawing Sheets

Figure 3A:
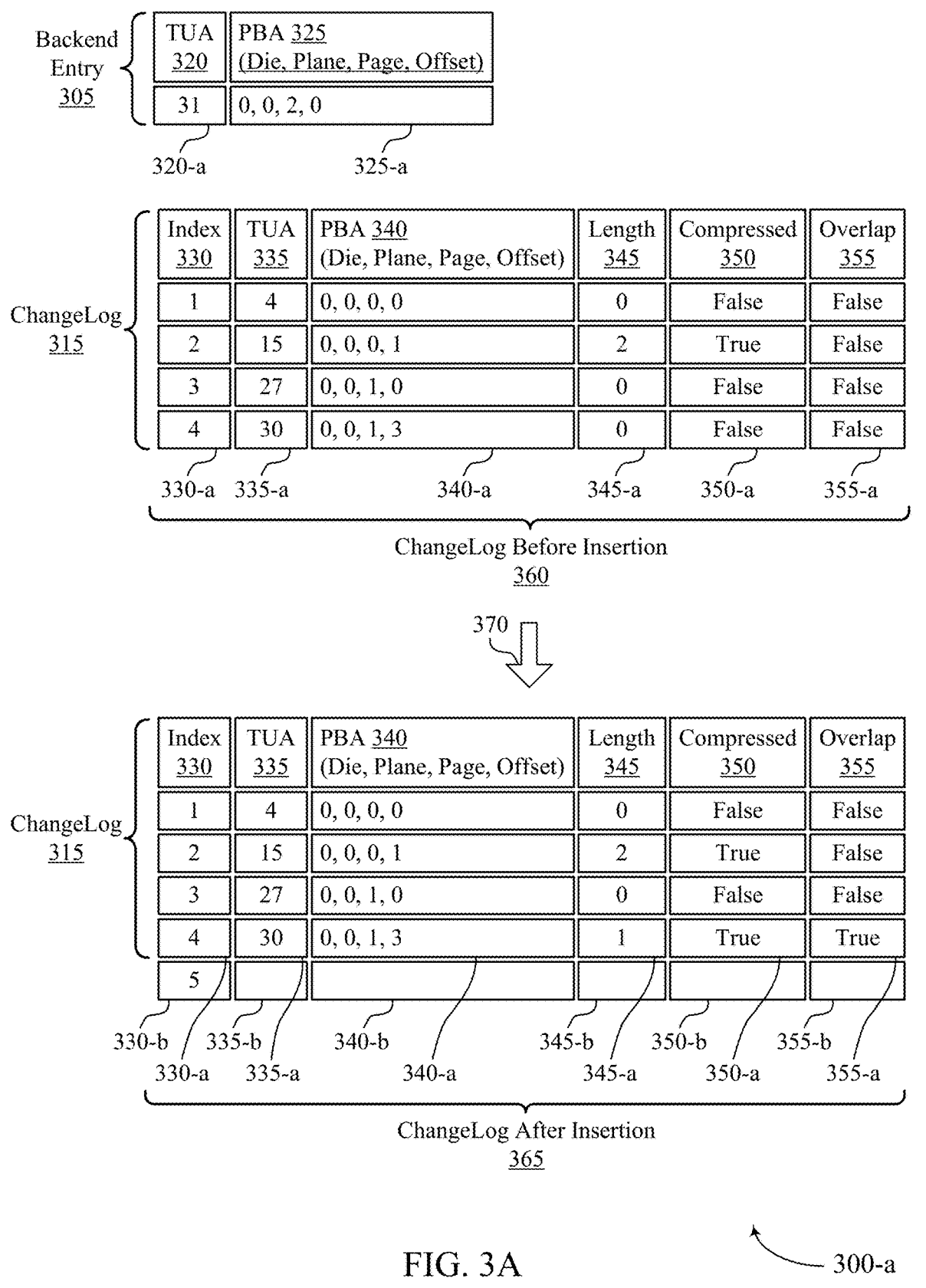

Backend Entry 305

| TUA 320 | PBA 325 (Die, Plane, Page, Offset) |
|---|---|
| 31 | 0, 0, 2, 0 |

320-a 325-a

ChangeLog 315

| Index 330 | TUA 335 | PBA 340 (Die, Plane, Page, Offset) | Length 345 | Compressed 350 | Overlap 355 |
|---|---|---|---|---|---|
| 1 | 4 | 0, 0, 0, 0 | 0 | False | False |
| 2 | 15 | 0, 0, 0, 1 | 2 | True | False |
| 3 | 27 | 0, 0, 1, 0 | 0 | False | False |
| 4 | 30 | 0, 0, 1, 3 | 0 | False | False |

330-a 335-a 340-a 345-a 350-a 355-a

ChangeLog Before Insertion 360

370

ChangeLog 315

| Index 330 | TUA 335 | PBA 340 (Die, Plane, Page, Offset) | Length 345 | Compressed 350 | Overlap 355 |
|---|---|---|---|---|---|
| 1 | 4 | 0, 0, 0, 0 | 0 | False | False |
| 2 | 15 | 0, 0, 0, 1 | 2 | True | False |
| 3 | 27 | 0, 0, 1, 0 | 0 | False | False |
| 4 | 30 | 0, 0, 1, 3 | 1 | True | True |
| 5 | | | | | |

330-b 335-b 340-b 345-b 350-b 355-b 330-a 335-a 340-a 345-a 350-a 355-a

ChangeLog After Insertion 365

FIG. 3A 300-a

Backend Entry 305

| TUA 320 | PBA 325 (Die, Plane, Page, Offset) |
|---|---|
| 29 | 0, 0, 1, 2 |

320-b 325-b

ChangeLog 315

| Index 330 | TUA 335 | PBA 340 (Die, Plane, Page, Offset) | Length 345 | Compressed 350 | Overlap 355 |
|---|---|---|---|---|---|
| 1 | 4 | 0, 0, 0, 0 | 0 | False | False |
| 2 | 15 | 0, 0, 0, 1 | 2 | True | False |
| 3 | 27 | 0, 0, 1, 0 | 0 | False | False |
| 4 | 30 | 0, 0, 1, 3 | 1 | True | False |

330-c 335-c 340-c 345-c 350-c 355-c

ChangeLog Before Insertion 360

370

ChangeLog 315

| Index 330 | TUA 335 | PBA 340 (Die, Plane, Page, Offset) | Length 345 | Compressed 350 | Overlap 355 |
|---|---|---|---|---|---|
| 1 | 4 | 0, 0, 0, 0 | 0 | False | False |
| 2 | 15 | 0, 0, 0, 1 | 2 | True | False |
| 3 | 27 | 0, 0, 1, 0 | 0 | False | False |
| 4 | 29 | 0, 0, 1, 2 | 2 | True | True |
| 5 | | | | | |

330-d 335-d 340-d 345-d 350-d 355-d 330-c 335-c 340-c 345-c 350-c 355-c

ChangeLog After Insertion 365

FIG. 3B 300-b

CHANGE LOG COMPRESSION

CROSS REFERENCE

The present Application for Patent claims priority to U.S. Patent Application No. 63/604,757 by Porzio et al., entitled "CHANGE LOG COMPRESSION," filed Nov. 30, 2023, which is assigned to the assignee hereof, and which is expressly incorporated by reference herein.

TECHNICAL FIELD

The following relates to one or more systems for memory, including change log compression.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states in response to the memory cells being disconnected from an external power source.

BRIEF DESCRIPTION OF THE DRAWINGS

FIGS. 3A, 3B, and 3C illustrates examples of direct compression modes that support change log compression in accordance with examples as disclosed herein.

DETAILED DESCRIPTION

Figure 1:
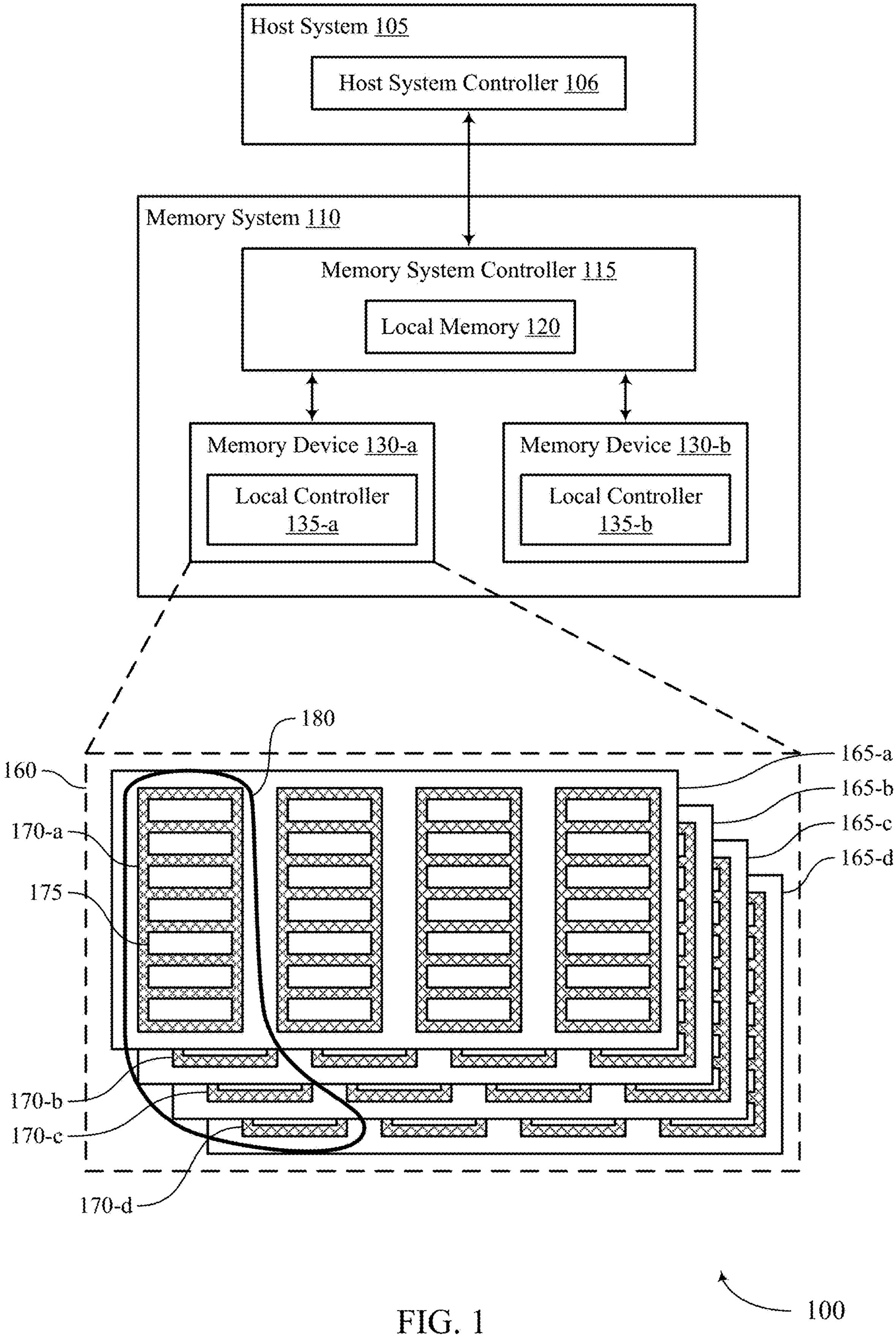
FIG. 1 illustrates an example of a system that supports change log compression in accordance with examples as disclosed herein.

A memory system may be coupled with, and may receive commands (e.g., read commands, write commands) from, a host system. For some commands, the host system may refer to a location of stored data in the memory system, using a logical block address (LBA) (e.g., assigned by the host system) to identify a logical location of the stored data page. The LBA may be mapped to a physical address of the memory system at which the data is stored. Because the physical address of the data may change (e.g., in response to data being updated by writing the updated data to a different page), some memory systems maintain one or more logical-to-physical (L2P) mappings that map LBAs generated by the host system to corresponding physical addresses generated by the memory system. In this manner, the host system can request to read data from the memory system using a same LBA as was used for writing the data even if the data has been moved to a different physical address. Each L2P mapping may be stored in non-volatile memory (e.g., NAND memory). In the case that a change is to be made to the L2P mapping, a portion of the L2P mapping may be loaded into a cache (e.g., an SRAM) of the memory system and changes may be performed. The process of transferring the portions of the L2P mapping from the NAND to the SRAM, updating the portions in the SRAM, and writing back to NAND can impact the performance of the memory system.

The memory system may support a data structure, such as a change log that defines (e.g., maintains, tracks, records) changes to perform and associated with the memory system. The memory system may use the change log to maintain a list (e.g., entries) of changes to perform to each L2P mapping and then may perform many of the changes concurrently. This process of using a change log to aggregate changes before making the changes may improve the efficiency of updating the L2P mapping. Some techniques for maintaining a change log include not compressing the change log entries (e.g., one change-log entry for one change to the L2P mapping). However, because the change log entries are not compressed, the memory system may, for example, periodically or aperiodically flush (e.g., refresh, clean out, make changes to) contents of the change log, which may decrease the performance of the memory system.

As described herein, various aspects of the present disclosure relate to enabling a memory system to support compressing entries of a change log and improving the efficiency of the memory system by enabling the memory system changes associated with the change log to occur (e.g., to be handled) concurrently. For example, data traffic between a host system and a memory system may be sequential (e.g., data is sequential), and each change log entry may be represented by a LBA, a physical block address (PBA), a length field, a compressed indication field, an overlap indicator field, or a combination thereof. Either a "staged" compression technique or a "direct" compression technique may be used (sometimes referred to as a lazy compression technique). In the case that data is sequential (e.g., both in LBA and PBA), staged compression may be used. As such, the memory system (e.g., via executing firmware) may "stage" an entry (e.g., create a temporary entry to be pushed into the change log) including the logical address and physical address of a backend entry prior to pushing (e.g., forwarding, outputting, moving) the entry into the change log. For example, the memory system (e.g., via executing firmware) may merge a new entry with the staged entry (e.g., if the new entry is a viable candidate for such, creating a merged entry), may update the previously-staged entry, and may subsequently release the merged entry to the change log. In the case of a direct compression, the memory system (e.g., via executing firmware) may decide whether the backend entry can be directly merged with existing entries of the change log.

Features of the disclosure are initially described in the context of a system with reference to FIG. 1. Features of the disclosure are described in the context of staged and direct compression modes with reference to FIGS. 2A, 2B, 2C, 2D, 3A, 3B, and 3C. These and other features of the disclosure are further illustrated by and described in the context of an apparatus diagram and flowchart that relate to change log compression with reference to FIGS. 4 and 5.

FIG. 1 illustrates an example of a system 100 that supports change log compression in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping may be stored within the memory cells of the memory device 130 (e.g., within one or more blocks 170 or planes 165) for use (e.g., reference and updating) by the local controller 135 or memory system controller 115.

In some cases, L2P mapping may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased.

The system 100 may include any quantity of non-transitory computer readable media that support change log compression. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may be coupled with, and may receive commands (e.g., read commands, write commands) from, the host system 105. For some commands, the host system 105 may refer to a location of stored data in the memory system 110, using a logical LBA (e.g., assigned by the host system 105) to identify a logical location of the stored data page. The LBA may be mapped to a physical address (e.g., assigned by the memory system) of a page 175 of the memory system 110. Because the physical address of the data may change (e.g., in response to data being updated by writing the updated data to a different page 175), some memory systems maintain one or more L2P mappings that map LBAs generated by the host system 105 to corresponding physical addresses of pages 175 in the memory system 110. In this manner, the host system 105 can request to read data from the memory system 110 using a same LBA as was used for writing the data even if the data has been moved to a different physical address. In the case that a change has to be made to the L2P mapping, each L2P mapping may be stored in non-volatile memory (e.g., NAND memory) while the updates are performed. A portion of the L2P mapping may then be loaded into a cache (e.g., an SRAM) of the memory device 130 and changes may be performed. The process of transferring the portions of the L2P mapping from the NAND to the SRAM, updating the portions in the SRAM, and writing back to NAND can impact the performance of the memory system.

The memory system 110 may use a change log to store L2P mappings for recently performed access operations (e.g., write operations, unmap operations, erase operations). For example, after receiving a write command associated with a logic address, a controller of the memory system 110 may write data associated with the command to a physical address and may store the mapping between the logical address and the physical address in the change log. In some examples, the change log may include a quantity of entries (e.g., 4k entries, 8k entries), and thus may be able to handle a certain quantity of change log updates before a checkpoint is triggered and the memory system 110 may flush the change log by forwarding the stored updates to the L2P table, by writing the updated L2P table to a memory device 130 (e.g., a non-volatile memory), or both. As such, techniques to compress the entries of the change log in response to traffic being sequential—which may increase the storage availability of the change log and decrease the overall time spent executing change log checkpoints—may be beneficial.

As described herein, compression techniques may be used (e.g., in the case of sequential data traffic) to increase the efficiency of a change log. As such, entries of a compressed change log may be represented by various indicators. For example, each compressed entry of a change log may be represented by a translation unit address (TUA), a PBA, a length, a compression indication (e.g., indicating if the entry has been compressed), an overlap indicator (e.g., indicating if the entry overlaps with another entry, optional), or a combination thereof. These fields may be used and adjusted during the compression of entries in the change log.

A "staged" compression technique may be used in the case of sequential data traffic. In this "staged" compression technique, the memory system controller 115 may allocate a portion of the local memory 120 (e.g., the SRAM) as a staging area to temporarily store new change log entries prior to adding the new entry to the change log. Additionally, or alternatively, the memory device 130 may allocate a portion of the local memory 120 (e.g., the SRAM) as a staging area to temporarily store new change log entries prior to adding the new entry to the change log. While an entry is staged, the memory system 110 may manipulate (e.g., adjust, compress) the staged entry and then add it to the change log. For example, the memory system 110 may receive (e.g., detect, from the host system) a new access command and prepare it, as a backend entry, to be added to the change log. The memory system 110 may also create (e.g., allocate SRAM for) a staged entry. The memory system 110 may verify (e.g., confirm) that the data traffic is sequential and, if the traffic is indeed sequential, may push the backend entry to the staged entry and subsequently manipulate the fields (e.g., one or more of the TUA, the PBA, the length indicator, the compression indicator) of the staged entry. In the case that the traffic is non-sequential, however, the memory system 110 may push the backend entry to the staged entry queue (e.g., set), may push this staged entry to the change log, and may subsequently create a new staged entry. In response to receiving the last command from the host system 105 (e.g., emptying the backend queue), the memory system 110 may push any pending, staged entries into the change log. As such, this staged compression technique (e.g., compression via manipulation of staged entry fields before pushing into the change log) may enable efficient compression of the change log entries without implementation of hardware changes.

A "direct" compression technique may be used in the case of sequential data traffic. In this "direct" compression technique, the memory system 110 may search and manipulate (e.g., adjust, compress) the change log directly (e.g., may not use a staged entry). For example, the memory system 110 may receive (e.g., detect, from the host system 105) a new access command and prepare it, as a backend entry, to be added to the change log. The memory system 110 may then add the backend entry (e.g., the new entry) to the change log (e.g., the next available location in the change log). The memory system 110 may evaluate whether the backend entry can be merged with other (e.g., preexisting) entries of the change log. For example, the memory system 110 may back-merge, front-merge, or bimodal-merge the new entry with previously-added entries of the change log. To merge the new entry with other entries of the change log, the memory system 110 may manipulate the fields (e.g., one or more of the TUA, the PBA, the length indicator, the compression indicator) of the new entry. As such, this "direct" compression technique (e.g., compression via manipulation of the new entry fields after pushing into the change log) may enable efficient compression of the change log entries without implementation of hardware changes.

FIGS. 2A, 2B, 2C, and 2D illustrate examples of staged compression modes 200 that support change log compression in accordance with examples as disclosed herein. The staged compression modes 200 may be implemented by or implement aspects of the system 100 as described with reference to FIG. 1, or aspects thereof. The staged compression modes 200 may be implemented by a memory system configured to store data received from a host system and to send data to the host system, if requested by the host system using access commands (e.g., read commands or write commands).

Figure 2A:
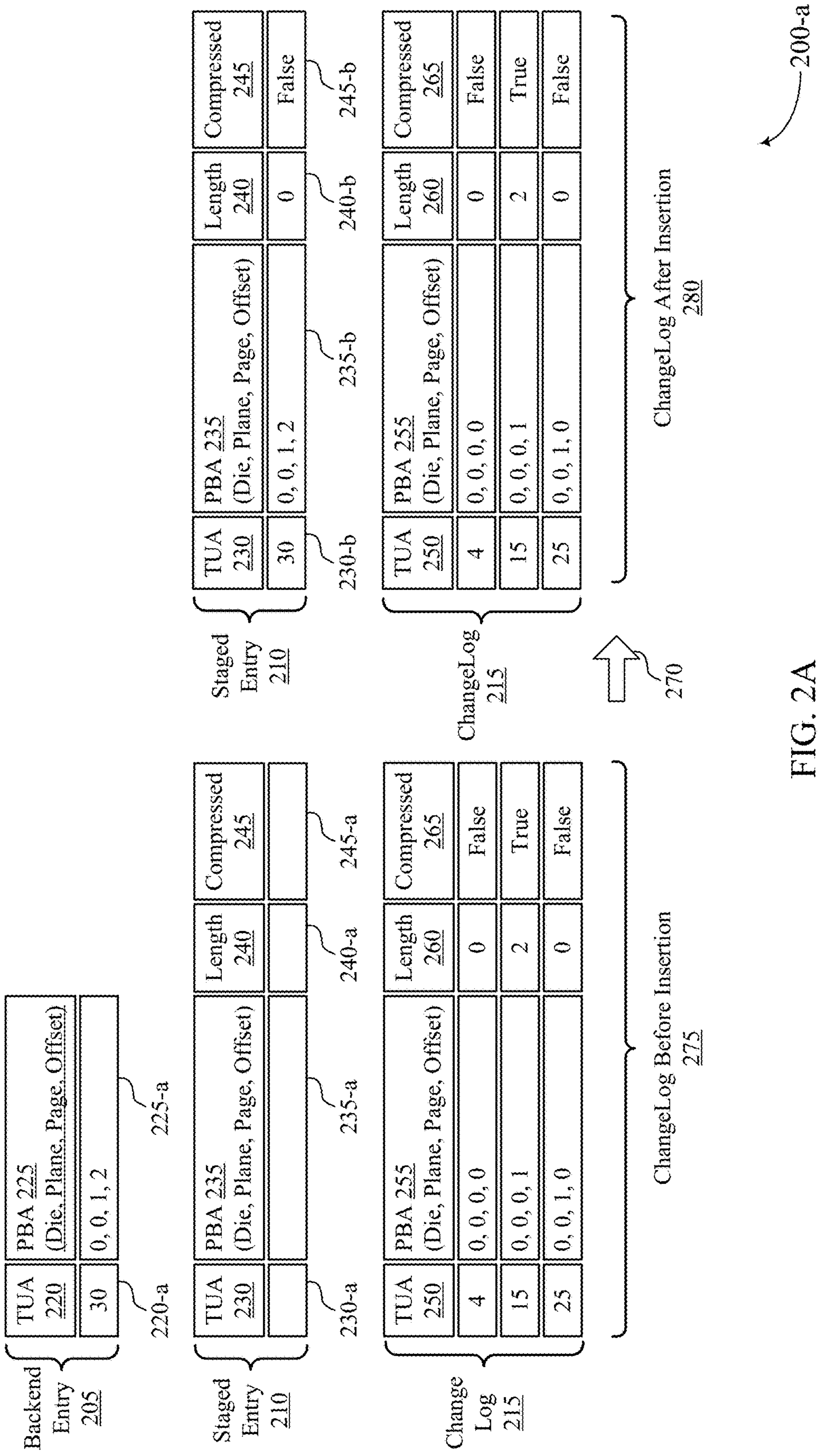
FIGS. 2A, 2B, 2C, and 2D illustrates examples of staged compression modes that support change log compression in accordance with examples as disclosed herein.

FIG. 2A illustrates an example of staged compression mode 200-*a* that supports change log compression in accordance with examples as disclosed herein. The staged compression mode 200-*a* may be an example of an empty-stage staged entry compression mode and may be implemented by or implement aspects of the system 100 as described with reference to FIG. 1, or aspects thereof. For example, the staged compression mode 200-*a* may be implemented by a memory system configured to store data received from a host system and to send data to the host system, if requested by the host system using access commands (e.g., read commands or write commands).

The staged compression mode 200-*a* may include a backend entry queue 205, a staged entry queue 210, and a change log 215 during a pre-insertion (e.g., pre-staged entry adjustment) period 275 and during a post-insertion (e.g., post staged entry adjustment) period 280, with an insertion 270 indicating changes made to the backend entry queue 205, the staged entry queue 210, the change log 215, or a combination thereof. The backend entry queue 205 may store an example of a backend entry that may include a TUA 220 and a PBA 225 for inclusion in the change log 215. For example, as the memory system performs an access operation (e.g., a write operation, an erase operation, an unmap operation), information may be generated that is to be added to the change log. The information that is generated as part of the access operation may be referred to as the backend entry. Some memory systems may include hardware (e.g., a change log manager or engine) that efficiently adds and/or removes information from the change log 215. Thus, in some cases, the memory system may generate the backend entry as part of an access operation and the backend entry may inserted into the change log 215 using the change log manager. The backend entry stored by the backend entry queue 205 may include the TUA 220-*a*, which stores the address of "30", and the PBA 225-*a*, which stores the die of "0," the plane of "0," the page of "1," and the offset of "2."

The staged entry queue 210 may be an example of data structure used by the memory system to temporarily store and/or manipulate entries before they are inserted into the change log 215. The backend entry may be information associated with given access operation. In some cases, the backend entry may immediately be inserted into the change log 215 as part of the access operation. In the techniques described herein, the backend entry may be temporarily stored in the staged entry queue 210 before being inserted into the change log 215. While in the staged entry queue 210, the memory system may perform additional access operations and thereby generate additional backend entries. If the next backend entry is compressible with the backend entry currently stored in the staged entry queue 210 (e.g., the staged entry), the memory system may modify the backend entry in the staged entry and store the updated backend entry and may continue doing access operations. Once the memory system encounters a backend entry in the backend entry queue 205 that is not compressible with the backend entry stored in the staged entry queue 210 (e.g., the staged entry), the memory system may transfer the backend entry stored in the staged entry queue 210 into the change log 215 and transfer the backend entry stored in the backend entry queue 205 into the staged entry queue 210. In this manner, the memory system may compress entries of the change log 215 before they are added to the change log.

The staged entry queue 210 may store an example of a staged entry that may include a TUA 230, a PBA 235, a length field 240, and a compression indicator 245 before the insertion 270 (e.g., pre-insertion period 275) and after the insertion 270 (e.g., post-insertion period 280). For example, the staged entry stored by the staged entry queue 210 during the pre-insertion period 275 may include the TUA 230-*a*, the PBA 225-*a*, the length field 240-*a*, and the compression indicator 245-*a*, which are empty (e.g., do not store any data). Similarly, the staged entry stored by the staged entry queue 210 during the post-insertion period 280 may include the TUA 230-*b* which stores the address of "30," the PBA 225-*b* which stores the die, plane, page, and the offset of "0,0,1,2," (respectively), the length field 240-*b* which stores the length of "0," and the compression indicator 245-*b* which stores the "false" indicator. The change log 215 may store examples of previously-stored change log entries that each may include a TUA 250, a PBA 255, a length field 260, and a compression indicator 265 before the insertion 270 (e.g., pre-insertion period 275) and after the insertion 270 (e.g., post-insertion period 280). For example, each entry stored by the change log 215 during both the pre-insertion period 275 and the post-insertion period 280 may include the TUAs 250, the PBAs 255, the length fields 260, and the compression indicators 265, which may contain various data that remains unchanged through the insertion 270.

The memory system may use the staged entry compression technique without a preexisting staged entry included in the staged entry queue 210. For example, in the case that the memory system receives a first command from a host system, or if previously-stored staged entries may have been released, the staged entry queue 210 may be empty (e.g., during a pre-insertion period 275, the TUA 230-*a* may be empty, the PBA 235-*a* may be empty, the length field 240-*a* may be empty, the compression indicator 245-*a* may be empty). As a result of receiving the command (and as described herein), the memory system may push the received command to the backend entry queue 205. Subsequently, the backend entry queue 205 may push the backend entry (e.g., the TUA 220-*a*, the PBA 225-*a*) to the staged entry queue 210 for staging. For example, the memory system (e.g., via executing firmware) may create a staged entry (e.g., the TUA 230-*a*, the PBA 235-*a*, the length field 240-*a*, the compression indicator 245-*a*) the from the LBA and TUA, and including the PBA, of the pushed backend entry (e.g., the TUA 220-*a*, the PBA 225-*a*). The memory system may then manipulate (e.g., update, modify, change, adjust) the fields of the staged entry. For example, the memory system may set the length field 240-*a* to zero (e.g., null) and may set the compression indicator 245-*a* to false (e.g., off). As such, after the memory system has manipulated (e.g., updated, modified, changed, adjusted) the fields of the staged entry queue 210 (e.g., after the insertion 270), the staged entry may include the TUA 230-*b* and the PBA 235-*b* of the original backend entry (e.g., the TUA 220-*a*, the PBA 225-*a*), as well as the length field 240-*b* and the compression indicator 245-*b*. As a result of updating the staged entry, the memory system may flag the backend entry (e.g., of the backend entry queue 205, the TUA 220-*a*, the PBA 225-*a*) as complete and may release the backend entry.

Figure 2B:
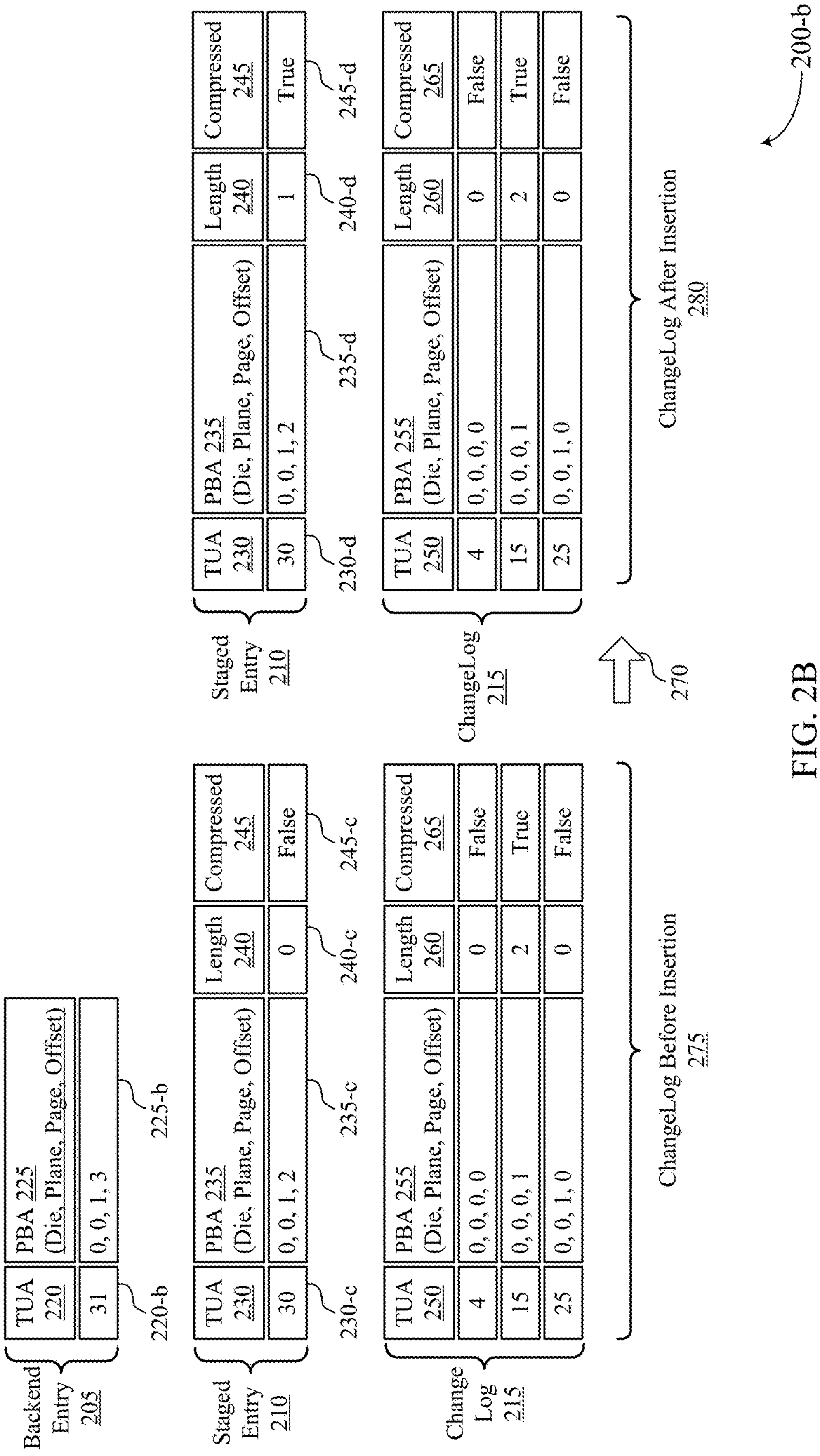

FIG. 2B illustrates an example of staged compression mode 200-*b* that supports change log compression in accordance with examples as disclosed herein. The staged compression mode 200-*b* may be an example of a back-merge staged entry compression mode and may be implemented by or implement aspects of the system 100 as described with reference to FIG. 1, or aspects thereof. For example, the staged compression mode 200-*b* may be implemented by a memory system configured to store data received from a host system and to send data to the host system, if requested by the host system using access commands (e.g., read commands or write commands).

The staged compression mode 200-*b* may include a backend entry queue 205, a staged entry queue 210, and a change log 215 during a pre-insertion (e.g., pre-staged entry adjustment) period 275 and during a post-insertion (e.g., post staged entry adjustment) period 280, with an insertion 270 indicating changes made to the backend entry queue 205, the staged entry queue 210, the change log 215, or a combination thereof. The backend entry queue 205 may store an example of a backend entry that may include a TUA 220 and a PBA 225. For example, the backend entry stored by the backend entry queue 205 may include the TUA 220-*b* which stores the address of "31", and the PBA 225-*b* which stores the die of "0," the plane of "0," the page of "1," and the offset of "3." The staged entry queue 210 may store an example of a staged entry that may include a TUA 230, a PBA 235, a length field 240, and a compression indicator 245 before the insertion 270 (e.g., pre-insertion period 275) and after the insertion 270 (e.g., post-insertion period 280). For example, the staged entry stored by the staged entry queue 210 during the pre-insertion period 275 may include the TUA 230-*c* which stores the address of "30," the PBA 225-*c* which stores the die, plane, page, and offset of "0,0,1,2," (respectively), the length field 240-*c* which stores the length of "0," and the compression indicator 245-*c* which stores the "false" indicator. Similarly, the staged entry stored by the staged entry queue 210 during the post-insertion period 280 may include the TUA 230-*d* which stores the address of "30," the PBA 225-*d* which stores the die, plane, page, and the offset of "0,0,1,2," (respectively), the length field 240-*d* which stores the length of "1," and the compression indicator 245-*d* which stores the "true" indicator. The change log 215 may store examples of previously-stored change log entries that each may include a TUA 250, a PBA 255, a length field 260, and a compression indicator 265 before the insertion 270 (e.g., pre-insertion period 275) and after the insertion 270 (e.g., post-insertion period 280). For example, each entry stored by the change log 215 during both the pre-insertion period 275 and the post-insertion period 280 may include the TUAs 250, the PBAs 255, the length fields 260, and the compression indicators 265, which may contain various data that remains unchanged through the insertion 270.

The memory system may use the staged entry compression technique in back-merging a backend entry (e.g., the TUA 220-*b*, the PBA 225-*b*) with a preexisting staged entry (e.g., the TUA 230-*c*, the PBA 235-*c*, the length field 240-*c*, the compression indicator 245-*c*). For example, the memory system may receive a new (e.g., a second, sequential) command from a host system while the staged entry queue 210 is populated (e.g., before insertion 270, with a preexisting staged entry, a first command). In such a case, the new entry (e.g., the backend entry stored in the backend entry queue 205) may be merged with the preexisting staged entry stored in the staged entry queue 210.

As a result of receiving the new command (and as described herein), the memory system may push (e.g., output) the new command (e.g., the new entry) to the backend entry queue 205 and may then test (e.g., analyze, review, evaluate) the backend entry (e.g., the new entry, the TUA 220-*b*, the PBA 225-*b*) for merging candidacy. For example, the memory system may compare the TUA 220-*b* of the backend entry of the backend entry queue 205 and the TUA 230-*c* of the staged entry of the staged entry queue 210. If the TUA 220-*b* of the backend entry is sequential to and greater than the TUA 230-*c* of the staged entry, the backend entry may be eligible for (e.g., test positive for) back-merging with the staged entry.

If the backend entry tests positive for back-merging with the staged entry, the backend entry queue 205 may back-merge the backend entry with the staged entry. For example, the memory system (e.g., via executing firmware) may manipulate (e.g., update) the fields of the staged entry (e.g., the TUA 230-*c*, the PBA 235-*c*, the length field 240-*c*, the compression indicator 245-*c*) to "merge" the backend entry with the staged entry. As such, the memory system may increment the length field 240-*c* by one (e.g., +1) and may set the compression indicator 245-*c* to true (e.g., on). As a result of the memory system manipulating the fields of the staged entry (e.g., after the insertion 270), the staged entry may include the TUA 230-*d* and the PBA 235-*d* of the original staged entry (e.g., the TUA 230-*c*, the PBA 235-*c*), as well as the manipulated length field 240-*d* and the compression indicator 245-*d* which indicate that a sequential entry (e.g., the second command, the new entry) has been back-merged with the original staged entry. The memory system may subsequently flag the backend entry (e.g., of the backend entry queue 205, the TUA 220-*b*, the PBA 225-*b*) as complete and may release the backend entry.

Figure 2C:
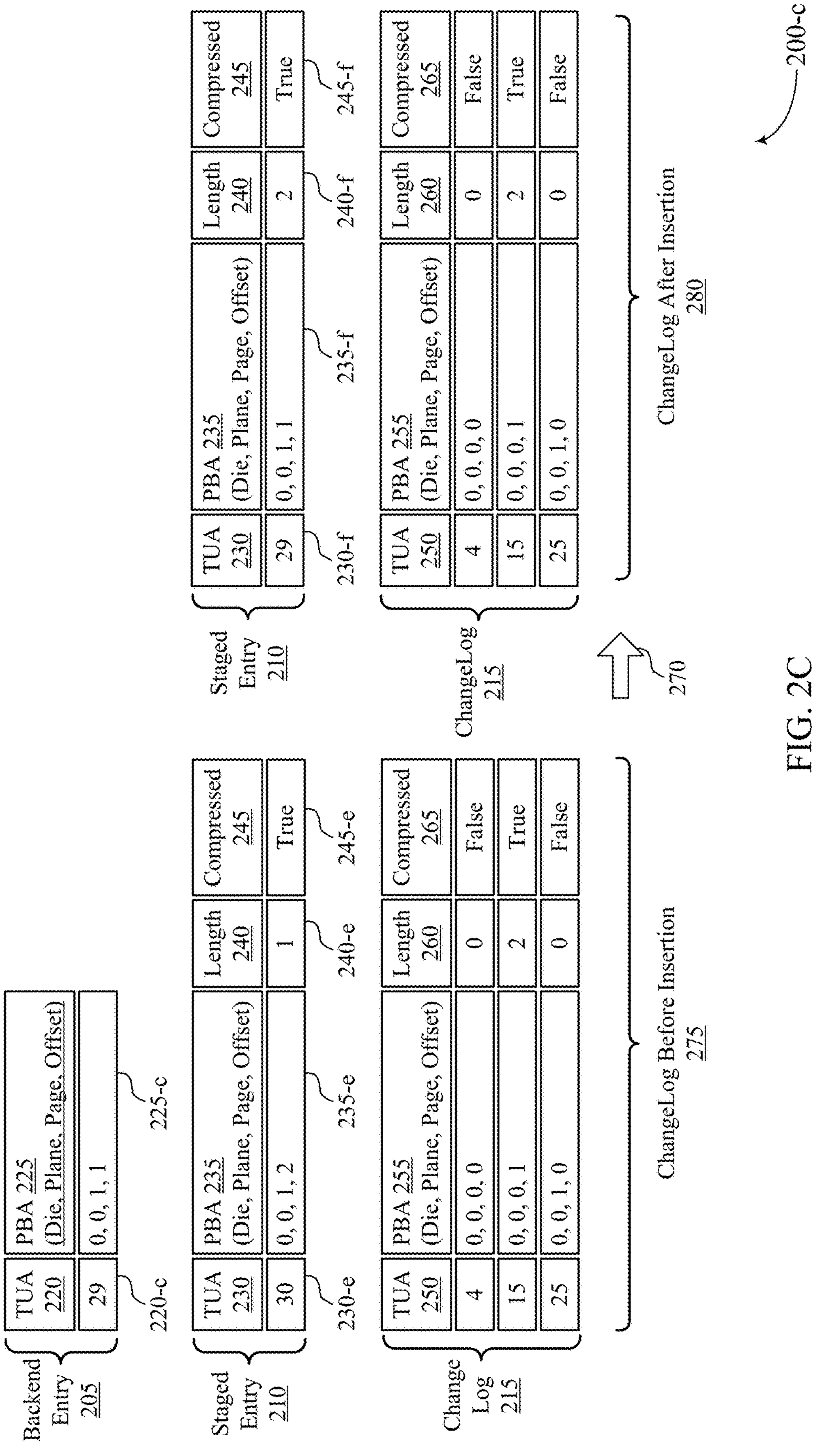

FIG. 2C illustrates an example of staged compression mode 200-*c* that supports change log compression in accordance with examples as disclosed herein. The staged compression mode 200-*c* may be an example of a front-merge staged entry compression mode and may be implemented by or implement aspects of the system 100 as described with reference to FIG. 1, or aspects thereof. For example, the staged compression mode 200-*c* may be implemented by a memory system configured to store data received from a host system and to send data to the host system, if requested by the host system using access commands (e.g., read commands or write commands).

The staged compression mode 200-*c* may include a backend entry queue 205, a staged entry queue 210, and a change log 215 during a pre-insertion (e.g., pre-staged entry adjustment) period 275 and during a post-insertion (e.g., post staged entry adjustment) period 280, with an insertion 270 indicating changes made to the backend entry queue 205, the staged entry queue 210, the change log 215, or a combination thereof. The backend entry queue 205 may store an example of a backend entry that may include a TUA 220 and a PBA 225. For example, the backend entry stored by the backend entry queue 205 may include the TUA 220-*c* which stores the address of "29", and the PBA 225-*c* which stores the die of "0," the plane of "0," the page of "1," and the offset of "1." The staged entry queue 210 may store an example of a staged entry that may include a TUA 230, a PBA 235, a length field 240, and a compression indicator 245 before the insertion 270 (e.g., pre-insertion period 275) and after the insertion 270 (e.g., post-insertion period 280). For example, the staged entry stored by the staged entry queue 210 during the pre-insertion period 275 may include the TUA 230-*e* which stores the address of "30," the PBA 235-*e* which stores the die, plane, page, and offset of "0,0,1,2," (respectively), the length field 240-*e* which stores the length of "1," and the compression indicator 245-*e* which stores the "true" indicator. Similarly, the staged entry stored by the staged entry queue 210 during the post-insertion period 280 may include the TUA 230-*f* which stores the address of "29," the PBA 235-*f* which stores the die, plane, page, and the offset of "0,0,1,1," (respectively), the length field 240-*f* which stores the length of "2," and the compression indicator 245-*f* which stores the "true" indicator. The change log 215 may store examples of previously-stored change log entries that each may include a TUA 250, a PBA 255, a length field 260, and a compression indicator 265 before the insertion 270 (e.g., pre-insertion period 275) and after the insertion 270 (e.g., post-insertion period 280). For example, each entry stored by the change log 215 during both the pre-insertion period 275 and the post-insertion period 280 may include the TUAs 250, the PBAs 255, the length fields 260, and the compression indicators 265, which may contain various data that remains unchanged through the insertion 270.

The memory system may use the staged entry compression technique in front-merging a backend entry (e.g., the TUA 220-*c*, the PBA 225-*c*) with a preexisting staged entry (e.g., the TUA 230-*e*, the PBA 235-*e*, the length field 240-*e*, the compression indicator 245-*e*). For example, the memory system may receive a new (e.g., a second, sequential) command from a host system while the staged entry queue 210 is populated (e.g., before insertion 270, with a preexisting staged entry, a first command). In such a case, the new entry may be merged with the preexisting staged entry of the staged entry queue 210.

As a result of receiving the new command (and as described herein), the memory system may push (e.g., output) the new command (e.g., the new entry) to the backend entry queue 205 and may then test (e.g., analyze) the backend entry (e.g., the new entry, the TUA 220-*c*, the PBA 225-*c*) for merging candidacy. For example, the memory system may compare the TUA 220-*c* of the backend entry of the backend entry queue 205 and the TUA 230-*e* of the staged entry of the staged entry queue 210. If the TUA 220-*c* of the backend entry is sequential to and less than the TUA 230-*e* of the staged entry, the backend entry may be eligible for (e.g., test positive for) front-merging with the staged entry.

As a result of the backend entry testing positive for front-merging with the staged entry, the backend entry queue 205 may front-merge the backend entry with the staged entry. For example, the memory system (e.g., via executing firmware) may manipulate (e.g., update) the fields of the staged entry (e.g., the TUA 230-*e*, the PBA 235-*e*, the length field 240-*e*, the compression indicator 245-*e*) to "merge" the backend entry with the staged entry. As such, the memory system may decrement the TUA 230-*e* and the PBA 235-*e*, increment the length field 240-*e* by one (e.g., +1) and may set the compression indicator 245-*e* to true (e.g., on). As a result of the memory system manipulating the fields of the staged entry (e.g., after the insertion 270), the staged entry may include the manipulated TUA 230-*f*, the PBA 235-*f*, the length field 240-*f* and the compression indicator 245-*f* which indicate that a sequential entry (e.g., the second command, the new entry) has been front-merged with the original staged entry. The memory system may subsequently flag the backend entry (e.g., of the backend entry queue 205, the TUA 220-*c*, the PBA 225-*c*) as complete and may release the backend entry.

Figure 2D:
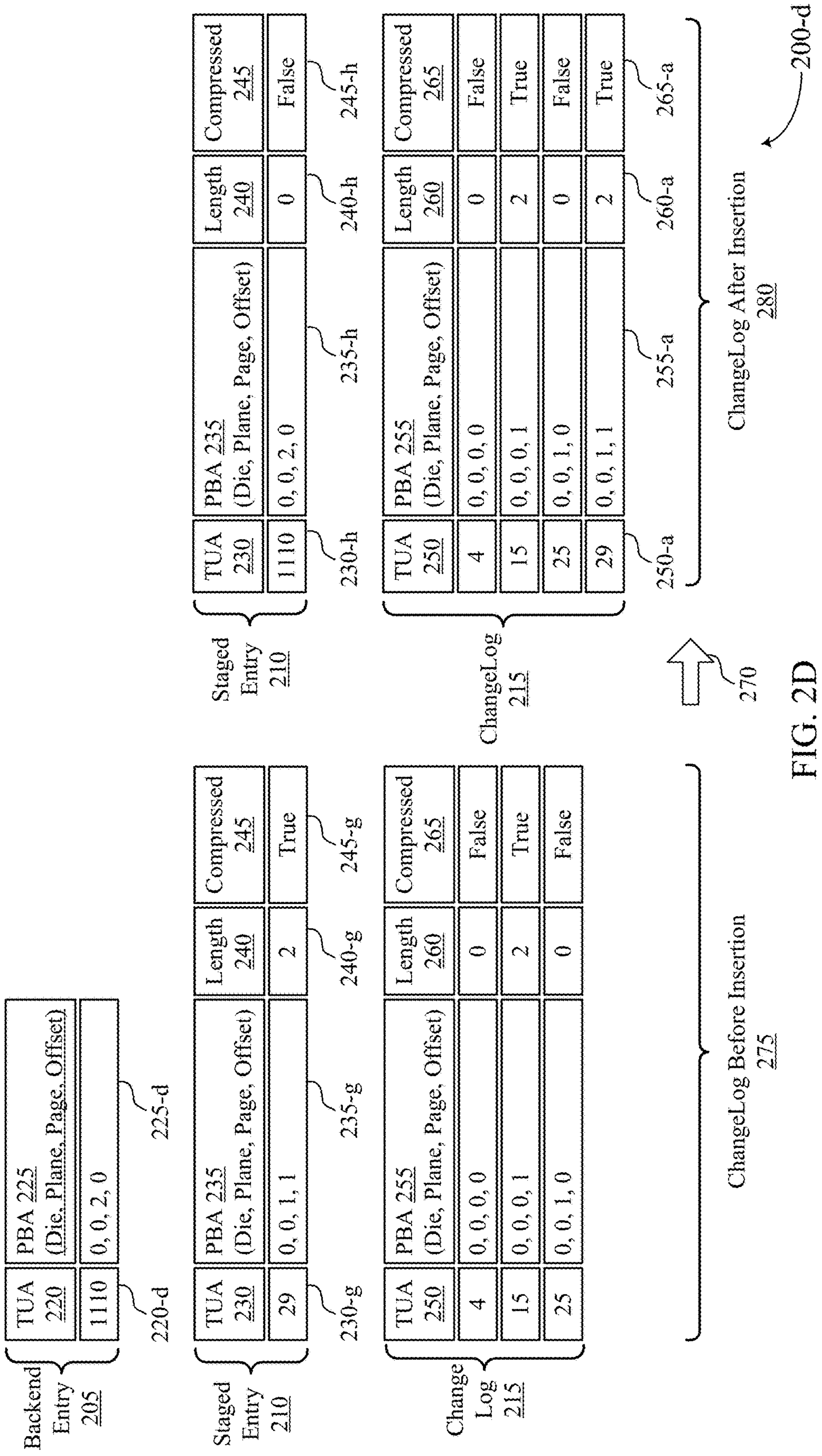

FIG. 2D illustrates an example of staged compression mode 200-*d* that supports change log compression in accordance with examples as disclosed herein. The staged compression mode 200-*d* may be an example of a non-sequential merge staged entry compression mode and may be implemented by or implement aspects of the system 100 as described with reference to FIG. 1, or aspects thereof. For example, the staged compression mode 200-*d* may be implemented by a memory system configured to store data received from a host system and to send data to the host system, if requested by the host system using access commands (e.g., read commands or write commands).

The staged compression mode 200-*d* may include a backend entry queue 205, a staged entry queue 210, and a change log 215 during a pre-insertion (e.g., pre-staged entry adjustment) period 275 and during a post-insertion (e.g., post staged entry adjustment) period 280, with an insertion 270 indicating changes made to the backend entry queue 205, the staged entry queue 210, the change log 215, or a combination thereof. The backend entry queue 205 may store an example of a backend entry that may include a TUA 220 and a PBA 225. For example, the backend entry stored by the backend entry queue 205 may include the TUA 220-*d* which stores the address of "1110", and the PBA 225-*d* which stores the die of "0," the plane of "0," the page of "2," and the offset of "0." The staged entry queue 210 may store an example of a staged entry that may include a TUA 230, a PBA 235, a length field 240, and a compression indicator 245 before the insertion 270 (e.g., pre-insertion period 275) and after the insertion 270 (e.g., post-insertion period 280). For example, the staged entry stored by the staged entry queue 210 during the pre-insertion period 275 may include the TUA 230-*g* which stores the address of "29," the PBA 235-*g* which stores the die, plane, page, and offset of "0,0,1,1," (respectively), the length field 240-*g* which stores the length of "2," and the compression indicator 245-*g* which stores the "true" indicator. Similarly, the staged entry stored by the staged entry queue 210 during the post-insertion period 280 may include the TUA 230-*h* which stores the address of "1110," the PBA 235-*h* which stores the die, plane, page, and the offset of "0,0,2,0," (respectively), the length field 240-*h* which stores the length of "0," and the compression indicator 245-*h* which stores the "false" indicator. The change log 215 may store examples of previously-stored change log entries that each may include a TUA 250, a PBA 255, a length field 260, and a compression indicator 265 before the insertion 270 (e.g., pre-insertion period 275) and after the insertion 270 (e.g., post-insertion period 280). For example, the change log 215 may be updated such that, during the post-insertion period 280, the change log 215 may include the TUA 250-*a*, the PBA 255-*a*, the length field 260-*a*, and the compression indicator 265-*a*, which may all contain various data from the staged entry queue 210 of the pre-insertion period 275.

The memory system may use the staged entry compression technique with a non-sequential backend entry (e.g., the TUA 220-*d*, the PBA 225-*d*) and a preexisting staged entry (e.g., the TUA 230-*g*, the PBA 235-*g*, the length field 240-*g*, the compression indicator 245-*g*). For example, the memory system may receive a new (e.g., a second, non-sequential) command from a host system while the staged entry queue 210 is populated (e.g., before insertion 270, with a preexisting staged entry, a first command). In such a case, the new, non-sequential entry may not be merged with the preexisting staged entry of the staged entry queue 210.

As a result of receiving the new command (and as described herein), the memory system may push (e.g., output) the new command (e.g., the new entry) to the backend entry queue 205 and may then test (e.g., analyze) the backend entry (e.g., the new entry, the TUA 220-*d*, the PBA 225-*d*) for merging candidacy. For example, the memory system may compare the TUA 220-*d* of the backend entry of the backend entry queue 205 and the TUA 230-*g* of the staged entry of the staged entry queue 210. If the TUA 220-*d* of the backend entry tests to be non-sequential to the TUA 230-*g* of the staged entry, the backend entry may not be eligible for (e.g., test negative for) merging with the staged entry.

As a result of the backend entry testing negative for merging with the staged entry, the backend entry queue 205 may push (e.g., move) the staged entry to the change log 215, and may push the backend entry to replace the staged entry. For example, the memory system (e.g., via executing firmware) may manipulate (e.g., update) the fields (e.g., the TUA 250-*a*, the PBA 255-*a*, the length field 260-*a*, the compression indicator 265-*a*) of the change log 215 to add the previously-staged entry (e.g., the TUA 230-*g*, the PBA 235-*g*, the length field 240-*g*, the compression indicator 245-*g*) to the change log 215. After moving the previously-staged entry to the change log 215, the memory system (e.g., via executing firmware) may push the backend entry of the backend entry queue 205 to the staged entry queue 210. For example, the memory system (e.g., via executing firmware) may manipulate (e.g., update) the fields (e.g., the TUA 230-*g*, the PBA 235-*g*, the length field 240-*g*, the compression indicator 245-*g*) of the staged entry queue 210 to move the backend entry to the staged entry queue 210 (e.g., after the insertion 270, the TUA 230-*h*, the PBA 235-*h*).

Additionally, the memory system (e.g., via executing firmware) may manipulate (e.g., update) other fields of the new change log 215 entry (e.g., the original, non-sequential backend entry) in moving the backend entry to the change log 215. For example, the memory system may set the length field 240-*h* to zero (e.g., 0) and may set the compression indicator 245-*h* to false (e.g., off). As a result of the memory system manipulating the fields of the staged entry queue 210 and the change log 215 (e.g., after the insertion 270), the staged entry queue 210 may include the TUA 230-*h* and the PBA 235-*h* of the original backend entry of the backend entry queue 205 (e.g., the TUA 220-*d*, the PBA 225-*d*), as well as the manipulated length field 240-*h* and the compression indicator 245-*h* which indicate that a non-sequential entry (e.g., the second command, the new entry) has replaced the original staged entry, while the change log 215 (e.g., the TUA 250-*a*, the PBA 255-*a*, the length field 260-*a*, the compression indicator 265-*a*) may include the originally-staged entry (e.g., the TUA 230-*g*, the PBA 235-*g*, the length field 240-*g*, the compression indicator 245-*g*). The memory system may subsequently flag the backend entry (e.g., of the backend entry queue 205, the TUA 220-*d*, the PBA 225-*d*) as complete and may release the backend entry.

Figure 3C:
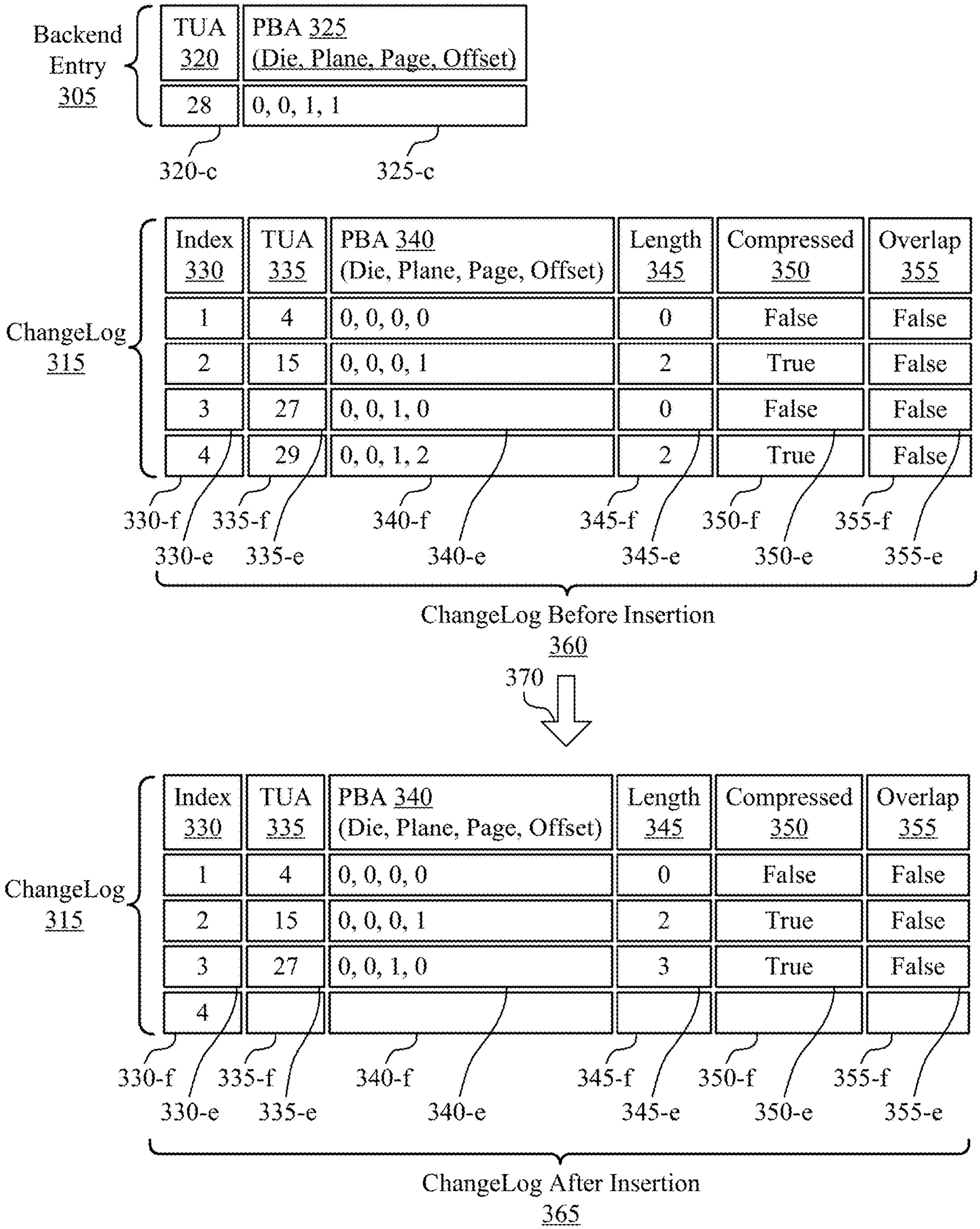

FIGS. 3A, 3B, and 3C illustrate examples of direct compression modes 300 that support change log compression in accordance with examples as disclosed herein. The direct compression modes 300 may be implemented by or implement aspects of a system 100 as described with reference to FIG. 1, or aspects thereof. The direct compression modes 300 may be implemented by a memory system configured to store data received from a host system and to send data to the host system, if requested by the host system using access commands (e.g., read commands or write commands).

FIG. 3A illustrates an example of direct compression mode 300-*a* that supports change log compression in accordance with examples as disclosed herein. The direct compression mode 300-*a* may be an example of a back-merge direct compression mode and may be implemented by or implement aspects of the system 100 as described with reference to FIG. 1, or aspects thereof. The direct compression mode 300-*a* may be implemented by a memory system configured to store data received from a host system and to send data to the host system, if requested by the host system using access commands (e.g., read commands or write commands). The direct compression mode may include the memory system immediately adding entries to the change log as part of access operations (e.g., storing backend entries into the change log 315). In the direct compression mode, the memory system may be able to search entries in the change log 315 and adjust the change log to increase compressibility. In contrast, the staged compression mode may not enable the memory system to search the change log similarly.

The direct compression mode 300-*a* may include a backend entry queue 305 and a change log 315 during a pre-insertion (e.g., pre change log entry adjustment) period 360 and during a post-insertion period 365 (e.g., post change log entry adjustment), with an insertion 370 indicating changes made (e.g., compression) to the backend entry queue 305, the change log 315, or both. The backend entry queue 305 may store an example of a backend entry that may include a TUA 320 and a PBA 325 for inclusion in the change log 315. For example, as the memory system performs an access operation (e.g., a write operation, an erase operation, an unmap operation), information may be generated that is to be added to the change log 315. The information that is generated as part of the access operation may be referred to as the backend entry. Some memory systems may include hardware (e.g., a change log manager or engine) that efficiently adds and/or removes information from the change log 315. Thus, in some cases, the memory system may generate the backend entry as part of an access operation and the backend entry may inserted into the change log 215 using the change log manager. In some examples of the direct compression mode, the memory system immediately stores entries associated with a backend entry in the change log 315. The backend entry stored by the backend entry queue 305 may include the TUA 320-*a* which stores the address of "31", and the PBA 325-*a* which stores the die of "0," the plane of "0," the page of "2," and the offset of "0."

The change log 315 may store examples of change log entries that may include an index field 330, a TUA 335, a PBA 340, a length field 345, a compression indicator 350, and an overlap indicator 355 before the insertion 370 (e.g., pre-insertion period 360) and after the insertion 370 (e.g., post-insertion period 365). For example, a change log entry stored by the change log 315 during the pre-insertion period 360 may include the index field 330-*a* which stores the index location of "4," the TUA 335-*a* which stores the address of "30," the PBA 340-*a* which stores the die, plane, page, and offset of "0,0,1,3," (respectively), the length field 345-*a* which stores the length of "0," the compression indicator 350-*a* which stores the "false" indicator, and the overlap indicator 355-*a* which stores the "false" indicator. Similarly, one of the entries stored by the change log 315 during the post-insertion period 365 may include the index field 330-*a* which stores the index location of "4," the TUA 335-*a* which stores the address of "30," the PBA 340-*a* which stores the die, plane, page, and offset of "0,0,1,3," (respectively), the length field 345-*a* which stores the length of "1," the compression indicator 350-*a* which stores the "true" indicator, and the overlap indicator 355-*a* which stores the "true" indicator. Another one of the entries stored by the change log 315 during the post-insertion period 365 may include the index field 330-*b* which stores the index location of "5," and the TUA 335-*b*, the PBA 340-*b*, the length field 345-*b*, the compression indicator 350-*b*, and the overlap indicator 355-*b* which are all empty (e.g., do not store any data).

The memory system may use the direct compression technique in back-merging a backend entry (e.g., of the backend entry queue 305) with a preexisting change log entry of the change log 315. For example, the memory system may receive a new (e.g., a second) command from a host system. The memory system may then commit the new command as a new entry and may push (e.g., output) the new entry to the backend entry queue 305. Subsequently, the memory system, or a subcomponent thereof (e.g., a change log 315 manager), may search the change log 315 for a location to insert the backend entry (e.g., the new entry, included in the backend entry queue 305). For example, the memory system may compare the TUA 320-*a* of the backend entry (e.g., the new entry, included in the backend entry queue 305) to the TUAs 335 included in the change log entry. By comparing the TUAs 335, the memory system may locate a location in the change log where the TUA 320-*a* of the backend entry may be inserted into the change log 315 in such a way that the backend entry may be sorted sequentially (e.g., linearly) with the preexisting TUAs 335 of the change log 315. The memory system may refer to the index field 330 of the determined location (e.g., index field 330-*b*) for future change log 315 insertions.

Before inserting the backend entry into the determined change log location, the memory system may detect (e.g., determine, using a insertion algorithm) that the backend entry may be merged with a previously-inserted entry of the change log 315. As such, the memory system may compare the TUAs 335 of adjacent entries (e.g., entries including adjacent, linearly-sequential indexes) of the determined location (e.g., the index field 330-*b*) in the change log to the TUA of the backend entry (e.g., the TUA 320-*a*). For example, in the case that the TUA 320-*a* of the backend entry is sequential to and greater than the TUA 335 of the previously-inserted, adjacent entries (e.g., including index field 330-*a*, the TUA 335-*a*), the backend entry may be eligible for (e.g., test positive for) back-merging with the previously-inserted, adjacent entry (e.g., index field 330-*a*).

As a result of the backend entry testing positive for back-merging with the previously-inserted entry, the backend entry queue 305 may back-merge the backend entry with the previously-inserted entry. For example, the memory system (e.g., via executing firmware) may manipulate (e.g., update) the fields of the previously-inserted entry (e.g., entry including the index field 330-*a*) to "merge" the backend entry of the backend entry queue 305 with the previously-inserted entry of the change log 315. As such, the memory system may increment the length field 345-*a* by one (e.g., +1), may set the compression indicator 350-*a* to true (e.g., on), and may update the overlap indicator 355. As a result of the memory system manipulating the fields of the previously-inserted entry of the change log 315 (e.g., after post-insertion period 365), the previously-inserted entry (e.g., located at the index field 330-*a*) may include the TUA and the PBA of the original previously-inserted entry (e.g., the TUA 335-*a*, the PBA 340-*a*), as well as the manipulated length field 345-*a* and the compression indicator 350-*a* which indicate that a sequential entry (e.g., the new entry, the original backend entry) has been back-merged with the original previously-inserted entry of the change log 315. The memory system may subsequently flag the backend entry of the backend entry queue 305 as complete and may release the backend entry. As such, the two entries may be "merged" without inserting the backend entry into the change log 315.

In some examples, it may not be possible to erase entries in the change log 315 without also updating the related L2P mapping. Such conditions may result in conflicting entries being present in the same change log 315 after performing the compression techniques described herein. Thus, to support change log compression, the memory system may also include techniques to account for overlap between entries and thereby enable efficient searching of the change log 315. Efficient searching of the change log 315 may be useful in response to adding new entries to the change log 315 using the direct compression techniques or in response to updating the L2P mapping using the change log 315. The memory system may use two different techniques to support efficient searching. In a first example, the memory system may use an overlap indicator. In a second example, the memory system may use techniques to split entries.

In some examples, the memory system may use the overlap indicator 355 to indicate that preexisting entries of the change log 315 may overlap with a new entry. For example, in response to inserting a new entry into the change log 315, the memory system may evaluate the LBA of the adjacent (e.g., previously-inserted) entries of the change log 315 to test for overlap potential. As such, the memory system may determine that an adjacent entry of the change log 315 may overlap with the new entry and may set the overlap indicator 355-*a* of the new entry to true (e.g., on, 1). In some examples, the memory system may determine that a non-adjacent entry of the change log 315 may overlap with the new entry and may also set the overlap indicator 355-*a* of the new entry to true (e.g., on, 1). The overlap indicator 355 may indicate that some or all of the information in a given entry in the change log 315 is invalid and that the memory system should examine other entries in the change log 315 near this entry when searching the change log 315 or if making changes to the L2P mapping based on the change log 315.

In some other examples, the memory system may split (e.g., segment, divide into portions) a preexisting entry of the change log 315 in response to adding a new compressed entry that may affect existing entries in the change log 315. For example, prior to inserting the new entry, the memory system may determine that one of the adjacent entries of the change log 315 may overlap with the new entry. As such, the memory system (e.g., a subset thereof) may split the preexisting entry of the change log 315 into one or more (e.g., three) portions. For example, the memory system may split the entry into three entries: A left, non-overlapping, compressed entry, a right non-overlapping, compressed entry, and an overlapping, compressed entry. The memory system may subsequently insert the new entry into the change log 315 next to the overlapping, compressed entry, and may release the backend entry (e.g., the original, new entry). Using the split entry techniques in response to adding an entry to the change log may take more processing resources than using the overlap indicator 355 in response to adding an entry to the change log. However, using the split entry techniques may cause the memory system to use fewer process resources to search the change log 315, as compared to using the overlap indicator techniques. For example, a memory system that uses the split entry techniques in response to adding new entries to the change log, may make more modifications to the change log 315 than overlap bit techniques in response to adding new entries. In contrast, searching a change log 315 that has been organized using split entry techniques may use less processing resources than overlap bit techniques because the memory system may be able to identify the correct information using a single entry (instead of checking multiple entries for different overlaps) at the search phase.

In some examples, the memory system may subsequently read the change log 315 in response to updating an L2P mapping based on the change log 315 or in response to adding a new backend entry to the change log 315. For example, the memory system may receive a read command including the LBA and the memory system may search the change log 315 for the LBA. The memory system (e.g., a subset thereof, a search engine) may return the index field 330 (e.g., position, location) of the change log 315 that includes or is near the requested LBA. The returned index field 330 (e.g., location) may correspond to an existing entry of the change log 315. In the case that the returned index field 330 (e.g., location) of the change log 315 corresponds to an existing entry, the memory system may read the corresponding PBA 340. Conversely, the returned index field 330 (e.g., location) may not correspond to an existing entry of the change log 315. In the case that the returned index field 330 (e.g., location) of the change log 315 may not correspond to an existing entry, the memory system may determine that an adjacent entry of the returned index field 330 may be compressed (e.g., the compression indicator 350 may be set to true) and may overlap (e.g., the overlap indicator 355 may be set to true) with the returned index field 330. As such, the memory system may read (e.g., produce, determine) the PBA 340 corresponding to the LBA according to the back-merge compression mode as described herein.

FIG. 3B illustrates an example of direct compression mode 300-*b* that supports change log compression in accordance with examples as disclosed herein. The direct compression mode 300-*b* may be an example of a front-merge direct compression mode and may be implemented by or implement aspects of the system 100 as described with reference to FIG. 1, or aspects thereof. The direct compression mode 300-*b* may be implemented by a memory system configured to store data received from a host system and to send data to the host system, if requested by the host system using access commands (e.g., read commands or write commands).

The direct compression mode 300-*b* may include a backend entry queue 305 and a change log 315 during a pre-insertion (e.g., pre change log entry adjustment) period 360 and during a post-insertion period 365 (e.g., post change log entry adjustment), with an insertion 370 indicating changes made (e.g., compression) to the backend entry queue 305, the change log 315, or both. The backend entry queue 305 may store an example of a backend entry that may include a TUA 320 and a PBA 325. For example, the backend entry stored by the backend entry queue 305 may include the TUA 320-*b* which stores the address of "29", and the PBA 325-*b* which stores the die of "0," the plane of "0," the page of "1," and the offset of "2." The change log 315 may store examples of change log entries that may include an index field 330, a TUA 335, a PBA 340, a length field 345, a compression indicator 350, and an overlap indicator 355 before the insertion 370 (e.g., pre-insertion period 360) and after the insertion 370 (e.g., post-insertion period 365). For example, a change log entry stored by the change log 315 during the pre-insertion period 360 may include the index field 330-*c* which stores the index location of "4," the TUA 335-*c* which stores the address of "30," the PBA 340-*c* which stores the die, plane, page, and offset of "0,0,1,3," (respectively), the length field 345-*c* which stores the length of "1," the compression indicator 350-*c* which stores the "true" indicator, and the overlap indicator 355-*c* which stores the "false" indicator. Similarly, one of the entries stored by the change log 315 during the post-insertion period 365 may include the index field 330-*c* which stores the index location of "4," the TUA 335-*c* which stores the address of "29," the PBA 340-*c* which stores the die, plane, page, and offset of "0,0,1,2," (respectively), the length field 345-*c* which stores the length of "2," the compression indicator 350-*c* which stores the "true" indicator, and the overlap indicator 355-*c* which stores the "true" indicator. Another one of the entries stored by the change log 315 during the post-insertion period 365 may include the index field 330-*d* which stores the index location of "5," and the TUA 335-*d*, the PBA 340-*d*, the length field 345-*d*, the compression indicator 350-*d*, and the overlap indicator 355-*d* which are empty (e.g., do not store any data).

In some examples, the memory system may use the direct compression technique in front-merging a backend entry (e.g., of the backend entry queue 305) with a preexisting change log entry of the change log 315. For example, the memory system may receive a new (e.g., a second) command from a host system. The memory system may then commit the new command as a new entry and may push the new entry to the backend entry queue 305. Subsequently, the memory system, or a subcomponent thereof (e.g., a change log 315 manager), may search the change log 315 for a location to insert the backend entry (e.g., the new entry, included in the backend entry queue 305). For example, the memory system may compare the TUA 320-*b* of the backend entry (e.g., the new entry, included in the backend entry queue 305) to the TUAs 335 included in the change log entry. By comparing the TUAs 335, the memory system may locate a location in the change log where the TUA 320-*b* of the backend entry may be inserted into the change log 315 in such a way that the backend entry may be sorted sequentially (e.g., linearly) with the preexisting TUAs 335 of the change log 315. The memory system may refer to the index field 330 of the determined location (e.g., index field 330-*d*) for future change log 315 insertions.

Before inserting the backend entry into the determined change log location, the memory system may detect (e.g., determine, using a insertion algorithm) that the backend entry may be merged with a previously-inserted entry of the change log 315. As such, the memory system may compare the TUAs 335 of adjacent entries (e.g., entries including adjacent, linearly-sequential indexes) of the determined location (e.g., the index field 330-*c*) in the change log to the TUA of the backend entry (e.g., the TUA 320-*b*). For example, in the case that the TUA 320-*b* of the backend entry is sequential to and less than the TUA 335 of the previously-inserted, adjacent entries (e.g., including index field 330-*c*, the TUA 335-*c*), the backend entry may be eligible for (e.g., test positive for) front-merging with the previously-inserted entry (e.g., index field 330-*c*).

As a result of the backend entry testing positive for front-merging with the previously-inserted entry, the backend entry queue 305 may front-merge the backend entry with the previously-inserted entry. For example, the memory system (e.g., via executing firmware) may manipulate (e.g., update) the fields of the previously-inserted entry (e.g., entry including the index field 330-*a*) to "merge" the backend entry of the backend entry queue 305 with the previously-inserted entry of the change log 315. As such, the memory system may increment the length field 345-*c* by one (e.g., +1), may decrement both the TUA 335-*c* and the PBA 340-*c* by one (e.g., −1), and may set the compression indicator 350-*c* to true (e.g., on). In some cases, decrementing the TUA 335-*c* and the PBA-c may result in the memory system storing the contents of the TUA 320-*b* and the PBA 325-*b* in the TUA 335-*c* and the PBA 340-*c* of the change log 315. As a result of the memory system manipulating the fields of the previously-inserted entry of the change log 315 (e.g., after post-insertion period 365), the previously-inserted entry (e.g., located at the index field 330-*c*) may include the manipulated length field 345-*c*, the TUA 335-*c*, the PBA 340-*c*, and the compression indicator 350-*c* which indicate that a sequential entry (e.g., the new entry, the backend entry) has been front-merged with the original previously-inserted entry of the change log 315. The memory system may subsequently flag the backend entry as complete and may release the backend entry. As such, the two entries may be "merged" without inserting the backend entry into the change log 315.

To support change log compression, the memory system may also include techniques to account for overlap between entries and thereby enable efficient searching of the change log 315. Efficient searching of the change log 315 may be useful in response to adding new entries to the change log 315 using the direct compression techniques or in response to updating the L2P mapping using the change log 315. The memory system may use two different techniques to support efficient searching. In a first example, the memory system may use an overlap indicator. In a second example, the memory system may use techniques to split entries.

In some examples, the memory system may use the overlap indicator 355 to indicate that preexisting entries of the change log 315 may overlap with a new entry. For example, in response to inserting a new entry into the change log 315, the memory system may evaluate the LBA of the adjacent (e.g., previously-inserted) entries of the change log 315 to test for overlap potential. As such, the memory system may determine that an adjacent entry of the change log 315 may overlap with the new entry and may set the overlap indicator 355-*c* of the new entry to true (e.g., on, 1). The overlap indicator 355 may indicate that some or all of the information in a given entry in the change log 315 is invalid and that the memory system should examine other entries in the change log 315 near this entry if searching the change log 315 or when making changes to the L2P mapping based on the change log 315. In some examples, the memory system may determine that a non-adjacent entry of the change log 315 may overlap with the new entry and may also set the overlap indicator 355-*c* of the new entry to true (e.g., on, 1).

In some other examples, the memory system may split (e.g., divide into portions) a preexisting entry of the change log 315 in response to adding a new entry that may affect existing entries in the change log 315. For example, prior to inserting the new entry, the memory system may determine that one of the adjacent entries of the change log 315 may overlap with the new entry. As such, the memory system (e.g., a subset thereof) may split the preexisting entry of the change log 315 into one or more (e.g., three) portions. For example, the memory system may split the entry into three entries: A left, non-overlapping, compressed entry, a right non-overlapping, compressed entry, and an overlapping, compressed entry. The memory system may subsequently insert the new entry into the change log 315 next to the overlapping, compressed entry, and may release the backend entry (e.g., the original, new entry). Using the split entry techniques in response to adding an entry to the change log may take more processing resources than using the overlap indicator 355 in response to adding an entry to the change log. However, using the split entry techniques may cause the memory system to use fewer process resources to search the change log 315, as compared to using the overlap indicator techniques.

In some examples, the memory system may subsequently read the change log 315 in response to updating an L2P mapping based on the change log 315 or in response to adding a new backend entry to the change log 315. For example, the memory system may receive an access command including the LBA of a change log 315 position and the memory system may search the change log 315 for the LBA. The memory system (e.g., a subset thereof, a search engine) may return the index field 330 (e.g., position, location) of the change log 315 that includes or is near the requested LBA. The returned index field 330 (e.g., location) may correspond to an existing entry of the change log 315. In the case that the returned index field 330 (e.g., location) of the change log 315 corresponds to an existing entry, the memory system may read the corresponding PBA 340. Conversely, the returned index field 330 (e.g., location) may not correspond to an existing entry of the change log 315. In the case that the returned index field 330 (e.g., location) of the change log 315 may not correspond to an existing entry, the memory system may determine that an adjacent entry of the returned index field 330 may be compressed (e.g., the compression indicator 350 may be set to true) and may overlap (e.g., the overlap indicator 355 may be set to true) with the returned index field 330. As such, the memory system may access (e.g., produce, determine) the PBA 340 corresponding to the LBA according to the back-merge compression mode as described herein. In some cases, that the returned index field 330 (e.g., location) of the change log 315 may not correspond to an existing entry and there is not a compressible adjacent entry, the memory system may create a new entry associated with the LBA in the access command.

FIG. 3C illustrates an example of direct compression mode 300-*c* that supports change log compression in accordance with examples as disclosed herein. The direct compression mode 300-*c* may be an example of a bimodal-merge compression mode and may be implemented by or implement aspects of a system 100 as described with reference to FIG. 1, or aspects thereof. The direct compression mode 300-*c* may be implemented by a memory system configured to store data received from a host system and to send data to the host system, if requested by the host system using access commands (e.g., read commands or write commands).

The direct compression mode 300-*c* may include a backend entry queue 305 and a change log 315 during a pre-insertion (e.g., pre change log entry adjustment) period 360 and during a post-insertion period 365 (e.g., post change log entry adjustment), with an insertion 370 indicating changes made (e.g., compression) to the backend entry queue 305, the change log 315, or both. The backend entry queue 305 may store an example of a backend entry that may include a TUA 320 and a PBA 325. For example, the backend entry stored by the backend entry queue 305 may include the TUA 320-*c* which stores the address of "28", and the PBA 325-*c* which stores the die of "0," the plane of "0," the page of "1," and the offset of "1." The change log 315 may store examples of change log entries that may include an index field 330, a TUA 335, a PBA 340, a length field 345, a compression indicator 350, and an overlap indicator 355 before the insertion 370 (e.g., pre-insertion period 360) and after the insertion 370 (e.g., post-insertion period 365). For example, a change log entry stored by the change log 315 during the pre-insertion period 360 may include the index field 330-*e* which stores the index location of "3," the TUA 335-*e* which stores the address of "27," the PBA 340-*e* which stores the die, plane, page, and offset of "0,0,1,0," (respectively), the length field 345-*e* which stores the length of "0," the compression indicator 350-*e* which stores the "false" indicator, and the overlap indicator 355-*e* which stores the "false" indicator. Another one of the change log entries stored by the change log 315 during the pre-insertion period 360 may include the index field 330-*f* which stores the index location of "4," the TUA 335-*f* which stores the address of "29," the PBA 340-*f* which stores the die, plane, page, and offset of "0,0,1,2," (respectively), the length field 345-*f* which stores the length of "2," the compression indicator 350-*f* which stores the "true" indicator, and the overlap indicator 355-*f* which stores the "false" indicator. Similarly, one of the entries stored by the change log 315 during the post-insertion period may include the index field 330-*e* which stores the index location of "3," the TUA 335-*e* which stores the address of "27," the PBA 340-*e* which stores the die, plane, page, and offset of "0,0,1,0," (respectively), the length field 345-*e* which stores the length of "3," the compression indicator 350-*e* which stores the "true" indicator, and the overlap indicator 355-*e* which stores the "false" indicator. Another one of the entries stored by the change log 315 during the post-insertion period 365 may include the index field 330-*f* which stores the index location of "4," and the TUA 335-*f*, the PBA 340-*f*, the length field 345-*f*, the compression indicator 350-*f*, and the overlap indicator 355-*f* which are empty (e.g., do not store any data).

In some examples, the memory system may use the direct compression technique in bimodal-merging a backend entry (e.g., of the backend entry queue 305) with a preexisting change log entry of the change log 315. For example, the memory system may receive a new (e.g., a second) command from a host system. The memory system may then commit the new command as a new entry and may push the new entry to the backend entry queue 305. Subsequently, the memory system, or a subcomponent thereof (e.g., a change log 315 manager), may search the change log 315 for a location to insert the backend entry (e.g., the new entry, included in the backend entry queue 305). For example, the memory system may compare the TUA 320-*c* of the backend entry (e.g., the new entry, included in the backend entry queue 305) to the TUAs 335 included in the change log entry. By comparing the TUAs 335, the memory system may locate a location in the change log where the TUA 320-*c* of the backend entry may be inserted into the change log 315 in such a way that the backend entry may be sorted sequentially (e.g., linearly) with the preexisting TUAs 335 of the change log 315. In some examples, based on this comparison of the TUAs 335, the memory system (e.g., the change log 315 manager) may determine the location to "insert" the backend entry in is between two preexisting entries of the change log 315. The memory system may refer to the index field 330 of the determined location (e.g., between the index field 330-*e* and the index field 330-*f*) for future change log 315 insertions.

Before inserting the backend entry into the determined change log location, the memory system may detect (e.g., determine, using a insertion algorithm) that the backend entry may be merged with a previously-inserted entry of the change log 315. For example, the memory system may compare the TUAs 335 of adjacent entries (e.g., entries including adjacent, linearly-sequential indexes) of the change log 315 to the TUA of the backend entry (e.g., the TUA 320-*c*). In the case that the TUA 320-*c* of the backend entry is sequential to and less than the TUA 335 of one of the previously-inserted, adjacent entries (e.g., including the index field 330-*f*, the TUA 335-*f*), the backend entry may be eligible for (e.g., test positive for) front-merging with the previously-inserted entry (e.g., the index field 330-*f*). Similarly, in the case that the TUA 320-*c* of the backend entry is sequential to and greater than the TUA 335 of the previously-inserted, adjacent entries (e.g., including the index field 330-*e*, the TUA 335-*e*), the backend entry may be eligible for (e.g., test positive for) back-merging with the previously-inserted entry (e.g., the index field 330-*e*). In such a case where the backend entry may test positive for both front-merging and back-merging, the memory system may determine that the backend entry may test positive for bimodal-merging.

As a result of the backend entry testing positive for bimodal-merging with the previously-inserted entries (e.g., the index field 330-*e*, the index field 330-*f*) the backend entry queue 305 may bimodal-merge (e.g., both front-merge and back-merge) the backend entry with the two previously-inserted entries. For example, the memory system (e.g., via executing firmware) may manipulate (e.g., update) the fields of a first entry (e.g., the index field 330-*e*) of the previously-inserted entries to "merge" both the backend entry and a second entry (e.g., the index field 330-*f*) of the previously-inserted entries with the first entry (e.g., the index field 330-*e*) of the previously-inserted entries. As such, similar to a front-merge, the memory system may increment the length field 345-*f* of the second entry of the previously-inserted entries by one (e.g., +1), may decrement both the TUA 335-*f* and the PBA 340-*f* by one (e.g., −1), and may set the compression indicator 350-*f* to true (e.g., on). The memory system may also, similarly to a back-merge, increment the length field 345-*e* of the first entry of the previously-inserted entries by one (e.g., +1) and may set the compression indicator 350-*e* to true (e.g., on). In other examples, the memory system may perform two front-merges or two back-merges instead of both a front-merge and a back-merge (e.g., a bimodal merge), based on the memory system (e.g., the change log 315 manager) determining an indexed location different than the index field 330-*f*.

As a result of the memory system manipulating the fields of the first entry (e.g., the index field 330-*e*) of the previously-inserted entries (e.g., after post-insertion period 365), the first entry (e.g., the index field 330-*e*) of the previously-inserted entries may include the manipulated length field 345-*e*, the TUA 335-*e*, the PBA 340-*e*, and compression indicator 350-*e* which indicate that three sequential entries (e.g., the backend entry, the first entry of the previously-inserted entries, and the second entry of the previously-inserted entries) have been bimodally-merged. The memory system may subsequently flag the backend entry as complete and may release the backend entry. The memory system (e.g., the change log 315 manager) may also remove the second entry of the previously-inserted entries (e.g., previously indexed as index field 330-*f*) from the change log 315. As such, the three entries may be "merged" without inserting the backend entry into the change log 315.

To support change log compression, the memory system may also include techniques to account for overlap between entries and thereby enable efficient searching of the change log 315. Efficient searching of the change log 315 may be useful in response to adding new entries to the change log 315 using the direct compression techniques or in response to updating the L2P mapping using the change log 315. The memory system may use two different techniques to support efficient searching. In a first example, the memory system may use an overlap indicator. In a second example, the memory system may use techniques to split entries.

In some examples, the memory system may use the overlap indicator 355 to indicate that preexisting entries of the change log 315 may overlap with a new entry. For example, in response to inserting a new entry into the change log 315, the memory system may evaluate the LBA of the adjacent (e.g., previously-inserted) entries of the change log 315 to test for overlap potential. As such, the memory system may determine that an adjacent entry of the change log 315 may overlap with the new entry and may set the overlap indicator 355-*e* of the new entry to true (e.g., on, 1). In some examples, the memory system may determine that a non-adjacent entry of the change log 315 may overlap with the new entry and may also set the overlap indicator 355-*e* of the new entry to true (e.g., on, 1). The overlap indicator 355 may indicate that some or all of the information in a given entry in the change log 315 is invalid and that the memory system should examine other entries in the change log 315 near this entry if searching the change log 315 or when making changes to the L2P mapping based on the change log 315.

In some other examples, the memory system may split (e.g., divide into portions) a preexisting entry of the change log 315 in response to adding a new entry that may affect existing entries in the change log 315. For example, prior to inserting the new entry, the memory system may determine that one of the adjacent entries of the change log 315 may overlap with the new entry. As such, the memory system (e.g., a subset thereof) may split the preexisting entry of the change log 315 into one or more (e.g., three) portions. For example, the memory system may split the entry into three entries: A left, non-overlapping, compressed entry, a right non-overlapping, compressed entry, and an overlapping, compressed entry. The memory system may subsequently insert the new entry into the change log 315 next to the overlapping, compressed entry, and may release the backend entry (e.g., the original, new entry). Using the split entry techniques in response to adding an entry to the change log may take more processing resources than using the overlap indicator 355 in response to adding an entry to the change log. However, using the split entry techniques may cause the memory system to use fewer process resources to search the change log 315, as compared to using the overlap indicator techniques.

In some examples, the memory system may subsequently read the change log 315 in response to updating an L2P mapping based on the change log 315 or in response to adding a new backend entry to the change log 315. For example, the memory system may receive an access command including the LBA of a change log 315 position and the memory system may search the change log 315 for the LBA. The memory system (e.g., a subset thereof, a search engine) may return the index field 330 (e.g., position, location) of the change log 315 that includes or is near the requested LBA. The returned index field 330 (e.g., location) may correspond to an existing entry of the change log 315. In the case that the returned index field 330 (e.g., location) of the change log 315 corresponds to an existing entry, the memory system may read the corresponding PBA 340. Conversely, the returned index field 330 (e.g., location) may not correspond to an existing entry of the change log 315. In the case that the returned index field 330 (e.g., location) of the change log 315 may not correspond to an existing entry, the memory system may determine that an adjacent entry of the returned index field 330 may be compressed (e.g., the compression indicator 350 may be set to true) and may overlap (e.g., the overlap indicator 355 may be set to true) with the returned index field 330. As such, the memory system may access (e.g., produce, determine) the PBA 340 corresponding to the LBA according to the back-merge compression mode as described herein. In some cases, that the returned index field 330 (e.g., location) of the change log 315 may not correspond to an existing entry and there is not a compressible adjacent entry, the memory system may create a new entry associated with the LBA in the access command.

Figure 4:
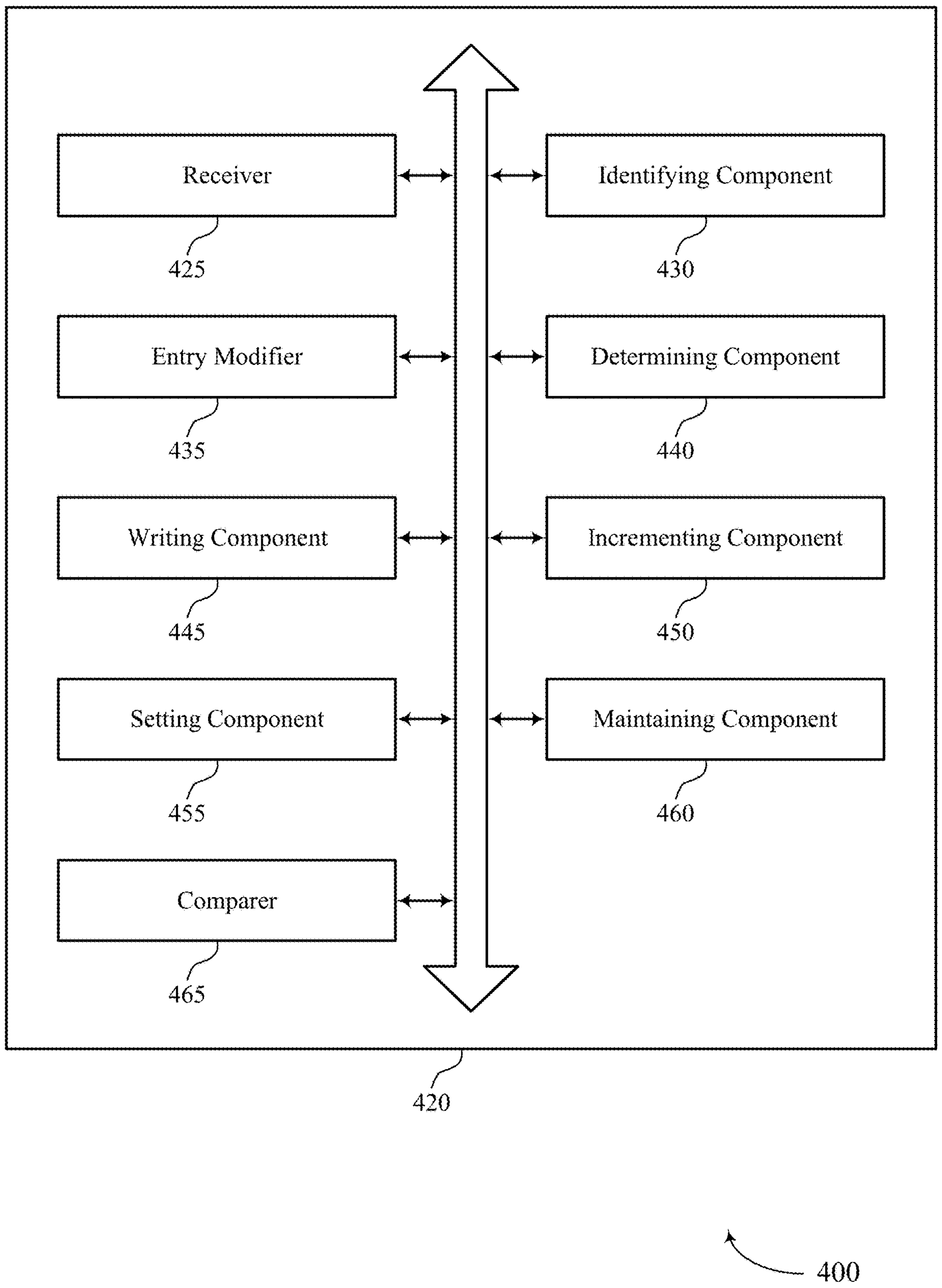
FIG. 4 illustrates a block diagram of a memory system that supports change log compression in accordance with examples as disclosed herein.

FIG. 4 illustrates a block diagram 400 of a memory system 420 that supports change log compression in accordance with examples as disclosed herein. The memory system 420 may be an example of aspects of a memory system as described with reference to FIGS. 1 through 3C. The memory system 420, or various components thereof, may be an example of means for performing various aspects of change log compression as described herein. For example, the memory system 420 may include a receiver 425, an identifying component 430, an entry modifier 435, a determining component 440, a writing component 445, an incrementing component 450, a setting component 455, a maintaining component 460, a comparer 465, or any combination thereof. Each of these components may communicate, directly or indirectly, with one another (e.g., via one or more buses).

The receiver 425 may be configured as or otherwise support a means for receiving a first command to write first data to a first block of a memory device, the first block associated with a first logical address and a first physical address. The identifying component 430 may be configured as or otherwise support a means for identifying an entry associated with a second logical address and a second physical address in a change log in response to receiving the first command. The entry modifier 435 may be configured as or otherwise support a means for modifying the entry associated with the change log to include information associated with the first command in response to receiving the first command and identifying the entry, the entry of the change log including a first field indicating a block address of the memory device, a second field indicating a length of data indicated by the entry, and a third field indicating a compression state indicative of whether the entry is associated with one or more logical addresses written to one or more blocks of the memory device.

In some examples, the identifying component 430 may be configured as or otherwise support a means for identifying the second logical address and the second physical address to write second data to a second block of the memory device. In some examples, the determining component 440 may be configured as or otherwise support a means for determining whether the first logical address and the second logical address are sequential or nonsequential.

In some examples, to support modifying the entry associated with the change log, the writing component 445 may be configured as or otherwise support a means for overwriting the first field of the entry associated with the change log to indicate a first block address associated with the first block of the memory device based at least in part on the first logical address preceding the second logical address. In some examples, to support modifying the entry associated with the change log, the incrementing component 450 may be configured as or otherwise support a means for incrementing a value of the second field of the entry associated with the change log to indicate a length of data indicative of the first data and the second data, wherein the length of data comprises a sum of a first length of the first data and a second length of the second data. In some examples, to support modifying the entry associated with the change log, the setting component 455 may be configured as or otherwise support a means for setting a value of the third field of the entry associated with the change log to indicate that the entry is associated with the first logical address, the first physical address, the second logical address, the second physical address, or a combination thereof.

In some examples, to support modifying the entry associated with the change log, the maintaining component 460 may be configured as or otherwise support a means for maintaining the first field of the entry associated with the change log to indicate a second block address associated with the second block of the memory device based at least in part on the first logical address following the second logical address. In some examples, to support modifying the entry associated with the change log, the incrementing component 450 may be configured as or otherwise support a means for incrementing a value of the second field of the entry associated with the change log to indicate a length of data indicative of the first data and the second data, wherein the length of data comprises a sum of a first length of the first data and a second length of the second data. In some examples, to support modifying the entry associated with the change log, the setting component 455 may be configured as or otherwise support a means for setting a value of the third field of the entry associated with the change log to indicate that the entry is associated with the first logical address, the first physical address, the second logical address, the second physical address, or a combination thereof.

In some examples, to support modifying the entry associated with the change log, the writing component 445 may be configured as or otherwise support a means for writing information associated with the first command in a second entry in the change log based at least in part on determining that the first logical address and the second logical address are nonsequential.

In some examples, the identifying component 430 may be configured as or otherwise support a means for identifying a second entry in the change log in response to receiving the first command, the second entry associated with a third command. In some examples, the identifying component 430 may be configured as or otherwise support a means for identifying a third logical address and a third physical address to write third data to a third block of the memory device. In some examples, the determining component 440 may be configured as or otherwise support a means for determining that the third logical address precedes the first logical address and that the third logical address follows the second logical address. In some examples, the maintaining component 460 may be configured as or otherwise support a means for modifying the entry associated with the change log is based at least in part on determining that the third logical address precedes the first logical address and that the third logical address follows the second logical address.

In some examples, to support modifying the entry associated with the change log, the maintaining component 460 may be configured as or otherwise support a means for maintaining the first field of the entry in the change log to indicate a second block address associated with the second block of the memory device based at least in part on the third logical address preceding the first logical address and the third logical address following the second logical address. In some examples, to support modifying the entry associated with the change log, the incrementing component 450 may be configured as or otherwise support a means for incrementing a value of the second field of the entry in the change log to indicate a length of data indicative of the first data, the second data, and the third data, wherein the length of data comprises a sum of a first length of the first data, a second length of the second data, and a third length of the third data. In some examples, to support modifying the entry associated with the change log, the setting component 455 may be configured as or otherwise support a means for setting a value of the third field of the entry in the change log to indicate that the second entry is associated with the first logical address, the first physical address, the second logical address, the second physical address, the third logical address, the third physical address, or a combination thereof.

In some examples, the determining component 440 may be configured as or otherwise support a means for determining that the first logical address associated with the first command matches the second logical address in the change log based at least in part on performing a search operation within the change log. In some examples, the entry modifier 435 may be configured as or otherwise support a means for modifying the entry associated with the change log. In some examples, the writing component 445 may be configured as or otherwise support a means for writing information associated with the first command in a second entry in the change log, the second entry including a fourth field indicating an overlap between the entry and the second entry based at least in part on that the first logical address associated with the first command matches the second logical address in the change log.

In some examples, to support performing the search operation within the change log, the comparer 465 may be configured as or otherwise support a means for comparing one or more respective entries in the change log including one or more respective logical addresses associated with the one or more respective entries and the first logical address associated with the first command to determine whether the one or more respective logical addresses associated with the one or more respective entries match the first logical address associated with the first command.

In some examples, to support performing the search operation within the change log, the identifying component 430 may be configured as or otherwise support a means for identifying one or more respective entries in the change log indicating a respective overlap with one or more other entries in the change log.

In some examples, to support modifying the entry associated with the change log, the entry modifier 435 may be configured as or otherwise support a means for splitting the entry in the change log into two separate entries including a first entry to write the first data to the first block of the memory device and a second entry to write second data to a second block of the memory device.

Figure 5:
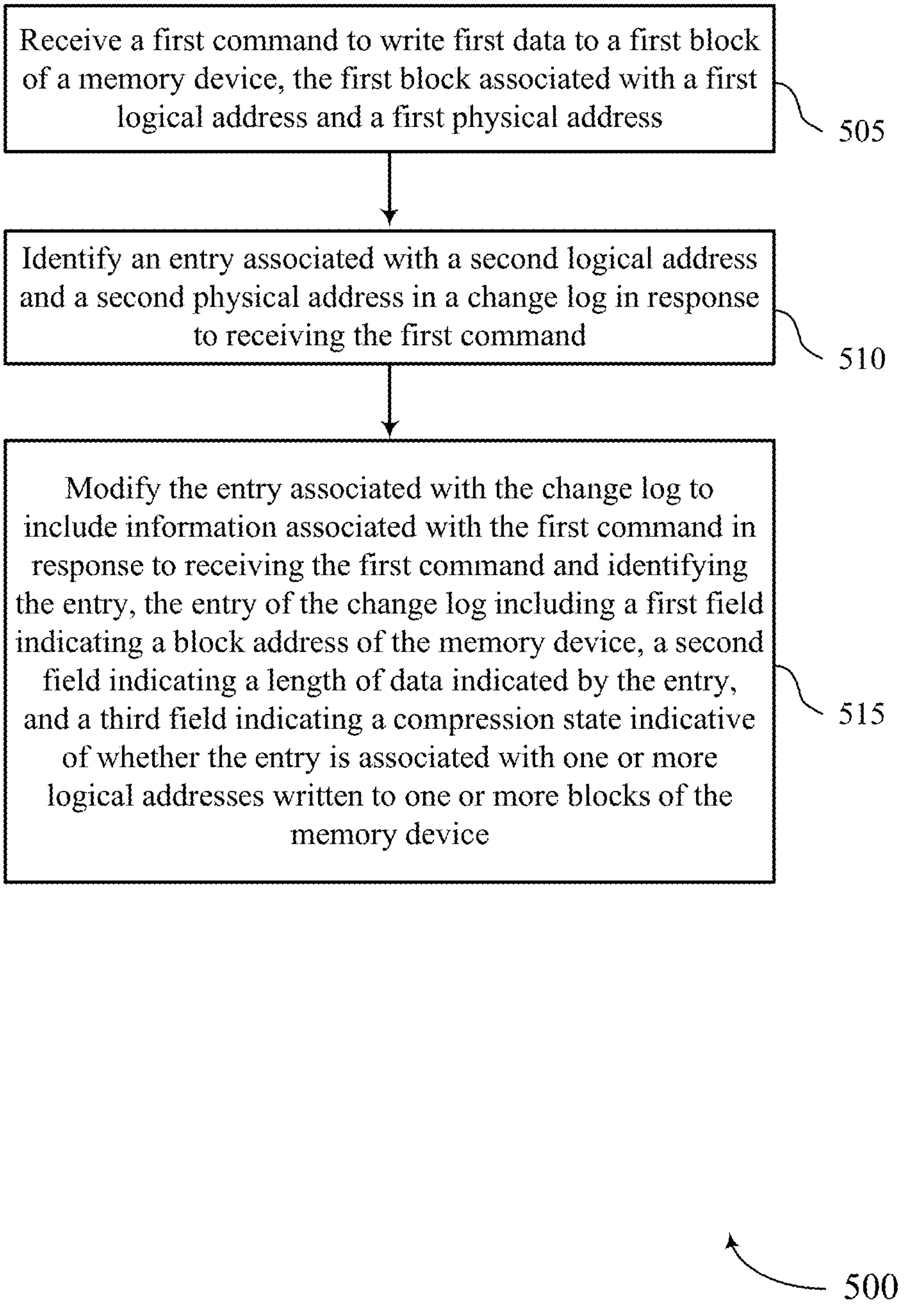
FIG. 5 illustrates a flowchart showing a method or methods that support change log compression in accordance with examples as disclosed herein.

FIG. 5 illustrates a flowchart showing a method 500 that supports change log compression in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a first command to write first data to a first block of a memory device, the first block associated with a first logical address and a first physical address. The operations of 505 may be performed in accordance with examples as disclosed herein. In some examples, aspects of the operations of 505 may be performed by a receiver 425 as described with reference to FIG. 4.

At 510, the method may include identifying an entry associated with a second logical address and a second physical address in a change log in response to receiving the first command. The operations of 510 may be performed in accordance with examples as disclosed herein. In some examples, aspects of the operations of 510 may be performed by an identifying component 430 as described with reference to FIG. 4.

At 515, the method may include modifying the entry associated with the change log to include information associated with the first command in response to receiving the first command and identifying the entry, the entry of the change log including a first field indicating a block address of the memory device, a second field indicating a length of data indicated by the entry, and a third field indicating a compression state indicative of whether the entry is associated with one or more logical addresses written to one or more blocks of the memory device. The operations of 515 may be performed in accordance with examples as disclosed herein. In some examples, aspects of the operations of 515 may be performed by an entry modifier 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a first command to write first data to a first block of a memory device, the first block associated with a first logical address and a first physical address; identifying an entry associated with a second logical address and a second physical address in a change log in response to receiving the first command; and modifying the entry associated with the change log to include information associated with the first command in response to receiving the first command and identifying the entry, the entry of the change log including a first field indicating a block address of the memory device, a second field indicating a length of data indicated by the entry, and a third field indicating a compression state indicative of whether the entry is associated with one or more logical addresses written to one or more blocks of the memory device.

Aspect 2: The method, apparatus, or non-transitory computer-readable medium of aspect 1, further including operations, features, circuitry, logic, means, or instructions, or any combination thereof for identifying the second logical address and the second physical address to write second data to a second block of the memory device; and determining whether the first logical address and the second logical address are sequential or nonsequential.

Aspect 3: The method, apparatus, or non-transitory computer-readable medium of aspect 2, where modifying the entry associated with the change log includes operations, features, circuitry, logic, means, or instructions, or any combination thereof for overwriting the first field of the entry associated with the change log to indicate a first block address associated with the first block of the memory device based at least in part on the first logical address preceding the second logical address; incrementing a value of the second field of the entry associated with the change log to indicate a length of data indicative of the first data and the second data, wherein the length of data comprises a sum of a first length of the first data and a second length of the second data; and setting a value of the third field of the entry associated with the change log to indicate that the entry is associated with the first logical address, the first physical address, the second logical address, the second physical address, or a combination thereof.

Aspect 4: The method, apparatus, or non-transitory computer-readable medium of any of aspects 2 through 3, where modifying the entry associated with the change log includes operations, features, circuitry, logic, means, or instructions, or any combination thereof for maintaining the first field of the entry associated with the change log to indicate a second block address associated with the second block of the memory device based at least in part on the first logical address following the second logical address; incrementing a value of the second field of the entry associated with the change log to indicate a length of data indicative of the first data and the second data, wherein the length of data comprises a sum of a first length of the first data and a second length of the second data; and setting a value of the third field of the entry associated with the change log to indicate that the entry is associated with the first logical address, the first physical address, the second logical address, the second physical address, or a combination thereof.

Aspect 5: The method, apparatus, or non-transitory computer-readable medium of any of aspects 2 through 4, where modifying the entry associated with the change log includes operations, features, circuitry, logic, means, or instructions, or any combination thereof for writing information associated with the first command in a second entry in the change log based at least in part on determining that the first logical address and the second logical address are nonsequential.

Aspect 6: The method, apparatus, or non-transitory computer-readable medium of any of aspects 2 through 5, further including operations, features, circuitry, logic, means, or instructions, or any combination thereof for identifying a second entry in the change log in response to receiving the first command, the second entry associated with a third command; identifying a third logical address and a third physical address to write third data to a third block of the memory device; determining that the third logical address precedes the first logical address and that the third logical address follows the second logical address; and where modifying the entry associated with the change log is based at least in part on determining that the third logical address precedes the first logical address and that the third logical address follows the second logical address.

Aspect 7: The method, apparatus, or non-transitory computer-readable medium of aspect 6, where modifying the entry associated with the change log includes operations, features, circuitry, logic, means, or instructions, or any combination thereof for maintaining the first field of the entry in the change log to indicate a second block address associated with the second block of the memory device based at least in part on the third logical address preceding the first logical address and the third logical address following the second logical address; incrementing a value of the second field of the entry in the change log to indicate a length of data indicative of the first data, the second data, and the third data, wherein the length of data comprises a sum of a first length of the first data, a second length of the second data, a third length of the third data; and setting a value of the third field of the entry in the change log to indicate that the second entry is associated with the first logical address, the first physical address, the second logical address, the second physical address, the third logical address, the third physical address, or a combination thereof.

Aspect 8: The method, apparatus, or non-transitory computer-readable medium of any of aspects 1 through 7, further including operations, features, circuitry, logic, means, or instructions, or any combination thereof for determining that the first logical address associated with the first command matches the second logical address associated with the second command in the change log based at least in part on performing a search operation within the change log; where modifying the entry associated with the change log includes writing information associated with the first command in a second entry in the change log, the second entry including a fourth field indicating an overlap between the entry and the second entry based at least in part on that the first logical address associated with the first command matches the second logical address in the change log.

Aspect 9: The method, apparatus, or non-transitory computer-readable medium of aspect 8, where performing the search operation within the change log includes operations, features, circuitry, logic, means, or instructions, or any combination thereof for comparing one or more respective entries in the change log including one or more respective logical addresses associated with the one or more respective entries and the first logical address associated with the first command to determine whether the one or more respective logical addresses associated with the one or more respective entries match the first logical address associated with the first command.

Aspect 10: The method, apparatus, or non-transitory computer-readable medium of any of aspects 8 through 9, where performing the search operation within the change log includes operations, features, circuitry, logic, means, or instructions, or any combination thereof for identifying one or more respective entries in the change log indicating a respective overlap with one or more other entries in the change log.

Aspect 11: The method, apparatus, or non-transitory computer-readable medium of any of aspects 8 through 10, where modifying the entry associated with the change log includes operations, features, circuitry, logic, means, or instructions, or any combination thereof for splitting the entry in the change log into two separate entries including a first entry to write the first data to the first block of the memory device and a second entry to write second data to a second block of the memory device.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively, (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

a memory device; and a controller coupled with the memory device and configured to cause the apparatus to:

receive a first command to write first data to a first block of the memory device, the first block associated with a first logical address and a first physical address;

identify an entry associated with a second logical address and a second physical address in a change log in response to receiving the first command; and modify the entry associated with the change log to include information associated with the first command in response to receiving the first command and identifying the entry, the entry of the change log comprising a first field indicating a block address of the memory device, a second field indicating a length of data indicated by the entry, and a third field comprising a compression state indicating that the entry is associated with the first logical address, the first physical address, the second logical address, and the second physical address in accordance with the modification.

2. The apparatus of claim 1, wherein the controller is configured to cause the apparatus to:

identify the second logical address and the second physical address to write second data to a second block of the memory device; and determine whether the first logical address and the second logical address are sequential or nonsequential.

3. The apparatus of claim 2, wherein, to modify the entry associated with the change log, the controller is configured to cause the apparatus to:

overwrite the first field of the entry associated with the change log to indicate a first block address associated with the first block of the memory device based at least in part on the first logical address preceding the second logical address;

increment a value of the second field of the entry associated with the change log to indicate a length of data indicative of the first data and the second data, wherein the length of data comprises a sum of a first length of the first data and a second length of the second data; and set a value of the third field of the entry associated with the change log to indicate that the entry is associated with the first logical address, the first physical address, the second logical address, and the second physical address.

4. The apparatus of claim 2, wherein, to modify the entry associated with the change log, the controller is configured to cause the apparatus to:

maintain the first field of the entry associated with the change log to indicate a second block address associated with the second block of the memory device based at least in part on the first logical address following the second logical address;

increment a value of the second field of the entry associated with the change log to indicate a length of data indicative of the first data and the second data, wherein the length of data comprises a sum of a first length of the first data and a second length of the second data; and set a value of the third field of the entry associated with the change log to indicate that the entry is associated with the first logical address, the first physical address, the second logical address, and the second physical address.

5. The apparatus of claim 2, wherein, to modify the entry associated with the change log, the controller is configured to cause the apparatus to:

write information associated with the first command in a second entry in the change log based at least in part on determining whether the first logical address and the second logical address are nonsequential.

6. The apparatus of claim 2, wherein the controller is further configured to cause the apparatus to:

identify a second entry in the change log in response to receiving the first command, the second entry associated with a third command;

identify a third logical address and a third physical address to write third data to a third block of the memory device; and determine whether the third logical address precedes the first logical address and that the third logical address follows the second logical address, wherein to modify the entry associated with the change log is based at least in part on determining whether the third logical address precedes the first logical address and that the third logical address follows the second logical address.

7. The apparatus of claim 6, wherein, to modify the entry associated with the change log, the controller is configured to cause the apparatus to:

maintain the first field of the entry in the change log to indicate a second block address associated with the second block of the memory device based at least in part on the third logical address preceding the first logical address and the third logical address following the second logical address;

increment a value of the second field of the entry in the change log to indicate a length of data indicative of the first data, the second data, and the third data, wherein the length of data comprises a sum of a first length of the first data, a second length of the second data, and a third length of the third data; and set a value of the third field of the entry in the change log to indicate that the second entry is associated with the first logical address, the first physical address, the second logical address, the second physical address, the third logical address, the third physical address, or a combination thereof.

8. The apparatus of claim 1, wherein the controller is further configured to cause the apparatus to:

determine whether the first logical address associated with the first command matches the second logical address in the change log based at least in part on performing a search operation within the change log, wherein, to modify the entry associated with the change log, the controller is configured to cause the apparatus to:

write information associated with the first command in a second entry in the change log, the second entry comprising a fourth field indicating an overlap between the entry and the second entry based at least in part on that the first logical address associated with the first command matches the second logical address in the change log.

9. The apparatus of claim 8, wherein, to perform the search operation within the change log, the controller is configured to cause the apparatus to:

compare one or more respective entries in the change log including one or more respective logical addresses associated with the one or more respective entries and the first logical address associated with the first command to determine whether the one or more respective logical addresses associated with the one or more respective entries match the first logical address associated with the first command.

10. The apparatus of claim 8, wherein, to perform the search operation within the change log, the controller is configured to cause the apparatus to:

identify one or more respective entries in the change log indicating a respective overlap with one or more other entries in the change log.

11. The apparatus of claim 8, wherein, to modify the entry associated with the change log, the controller is configured to cause the apparatus to:

split the entry in the change log into two separate entries comprising a first entry to write the first data to the first block of the memory device and a second entry to write second data to a second block of the memory device.

12. A non-transitory computer-readable medium storing code comprising instructions which, when executed by a processor of an electronic device, cause the electronic device to:

receive a first command to write first data to a first block of a memory device, the first block associated with a first logical address and a first physical address;

identify an entry associated with a second logical address and a second physical address in a change log in response to receiving the first command; and modify the entry associated with the change log to include information associated with the first command in response to receiving the first command and identifying the entry, the entry of the change log comprising a first field indicating a block address of the memory device, a second field indicating a length of data indicated by the entry, and a third field comprising a compression state indicating that the entry is associated with the first logical address, the first physical address, the second logical address, and the second physical address in accordance with the modification.

13. The non-transitory computer-readable medium of claim 12, wherein the instructions when executed by the processor of the electronic device, cause the electronic device to:

identify the second logical address and the second physical address to write second data to a second block of the memory device; and determine whether the first logical address and the second logical address are sequential or nonsequential.

14. The non-transitory computer-readable medium of claim 13, wherein the instructions, to modify the entry associated with the change log, when executed by the processor of the electronic device, cause the electronic device to:

overwrite the first field of the entry associated with the change log to indicate a first block address associated with the first block of the memory device based at least in part on the first logical address preceding the second logical address;

increment a value of the second field of the entry associated with the change log to indicate a length of data indicative of the first data and the second data, wherein the length of data comprises a sum of a first length of the first data and a second length of the second data; and set a value of the third field of the entry associated with the change log to indicate that the entry is associated with the first logical address, the first physical address, the second logical address, and the second physical address.

15. The non-transitory computer-readable medium of claim 13, wherein the instructions, to modify the entry associated with the change log, when executed by the processor of the electronic device, cause the electronic device to:

maintain the first field of the entry associated with the change log to indicate a second block address associated with the second block of the memory device based at least in part on the first logical address following the second logical address;

increment a value of the second field of the entry associated with the change log to indicate a length of data indicative of the first data and the second data, wherein the length of data comprises a sum of a first length of the first data and a second length of the second data; and set a value of the third field of the entry associated with the change log to indicate that the entry is associated with the first logical address, the first physical address, the second logical address, and the second physical address.

16. The non-transitory computer-readable medium of claim 13, wherein the instructions, to modify the entry associated with the change log, when executed by the processor of the electronic device, cause the electronic device to:

write information associated with the first command in a second entry in the change log based at least in part on determining whether the first logical address and the second logical address are nonsequential.

17. The non-transitory computer-readable medium of claim 13, wherein the instructions when executed by the processor of the electronic device, cause the electronic device to:

identify a second entry in the change log in response to receiving the first command, the second entry associated with a third command;

identify a third logical address and a third physical address to write third data to a third block of the memory device; and determine whether the third logical address precedes the first logical address and that the third logical address follows the second logical address, wherein to modify the entry associated with the change log is based at least in part on determining whether the third logical address precedes the first logical address and that the third logical address follows the second logical address.

18. The non-transitory computer-readable medium of claim 17, wherein the instructions, to modify the entry associated with the change log, when executed by the processor of the electronic device, cause the electronic device to:

maintain the first field of the entry in the change log to indicate a second block address associated with the second block of the memory device based at least in part on the third logical address preceding the first logical address and the third logical address following the second logical address;

increment a value of the second field of the entry in the change log to indicate a length of data indicative of the first data, the second data, and the third data, wherein the length of data comprises a sum of a first length of the first data, a second length of the second data, and a third length of the third data; and set a value of the third field of the entry in the change log to indicate that the second entry is associated with the first logical address, the first physical address, the second logical address, the second physical address, the third logical address, the third physical address, or a combination thereof.

19. The non-transitory computer-readable medium of claim 12, wherein the instructions when executed by the processor of the electronic device, cause the electronic device to:

determine whether the first logical address associated with the first command matches the second logical address in the change log based at least in part on performing a search operation within the change log, wherein, to modify the entry associated with the change log, the instructions when executed by the processor of the electronic device, cause the electronic device to:

write information associated with the first command in a second entry in the change log, the second entry comprising a fourth field indicating an overlap between the entry and the second entry based at least in part on that the first logical address associated with the first command matches the second logical address in the change log.

20. A method, comprising:

receiving a first command to write first data to a first block of a memory device, the first block associated with a first logical address and a first physical address;

identifying an entry associated with a second logical address and a second physical address in a change log in response to receiving the first command; and modifying the entry associated with the change log to include information associated with the first command in response to receiving the first command and identifying the entry, the entry of the change log comprising a first field indicating a block address of the memory device, a second field indicating a length of data indicated by the entry, and a third field comprising a compression state indicating that the entry is associated with the first logical address, the first physical address, the second logical address, and the second physical address in accordance with the modification.

* * * * *